United States Patent
Ichitani et al.

(10) Patent No.: US 9,200,895 B2
(45) Date of Patent: Dec. 1, 2015

(54) IMAGE INPUT DEVICE AND IMAGE PROCESSING DEVICE

(75) Inventors: Shuji Ichitani, Tokyo (JP); Koh Sei, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 314 days.

(21) Appl. No.: 13/884,402

(22) PCT Filed: Nov. 11, 2011

(86) PCT No.: PCT/JP2011/076049
§ 371 (c)(1),
(2), (4) Date: May 9, 2013

(87) PCT Pub. No.: WO2012/067028
PCT Pub. Date: May 24, 2012

(65) Prior Publication Data
US 2013/0229513 A1  Sep. 5, 2013

(30) Foreign Application Priority Data

Nov. 16, 2010 (JP) .................................. 2010-255683
Jan. 17, 2011 (JP) .................................. 2011-006657

(51) Int. Cl.
*H04N 5/33* (2006.01)
*G01B 11/14* (2006.01)
(Continued)

(52) U.S. Cl.
CPC ............ *G01B 11/14* (2013.01); *G02B 27/1066* (2013.01); *G03B 13/36* (2013.01);
(Continued)

(58) Field of Classification Search
CPC ......... H04N 5/235; H04N 5/332; H04N 9/07; H04N 5/33; H04N 9/67; H04N 9/77; G01B 11/14; G02B 27/1066; G03B 13/36; G03B 15/00

USPC .................................................. 348/135, 164
IPC .................................... H04N 5/33; G01B 11/44
See application file for complete search history.

(56) References Cited

U.S. PATENT DOCUMENTS 6,211,521 B1 * 4/2001 Bawolek ................ G02B 5/201
                                                                        250/208.1
6,292,212 B1 * 9/2001 Zigadlo ................... H04N 5/33
                                                                        250/338.1
(Continued)

FOREIGN PATENT DOCUMENTS

JP          11-308609 A     11/1999
JP         2003-104121 A     4/2003
(Continued)

OTHER PUBLICATIONS

International Search Report and Written Opinion of PCT/JP2011/076049 mailed Feb. 21, 2012.

*Primary Examiner* — Trang U Tran
(74) *Attorney, Agent, or Firm* — Lucas & Mercanti, LLP

(57) ABSTRACT

An image input device capable of obtaining a luminance signal and a chromaticity signal appropriately even when photographing at nighttime is provided. Further, an image processing device capable of forming an image in which an object can be confirmed visually even under a low luminance environment is provided. Since a color space converting unit assigns weights to the visible light component and the infrared light component based on positional information acquired by the positional information acquiring unit, and converts the original image data into color space including the luminance signal and the chromaticity signal, it is possible to obtain the color space appropriately according to a height of the object and a distance to the object.

15 Claims, 16 Drawing Sheets

(51) Int. Cl.
*G02B 27/10* (2006.01)
*G03B 13/36* (2006.01)
*G03B 15/00* (2006.01)
*H04N 5/235* (2006.01)
*H04N 9/07* (2006.01)
*H04N 9/67* (2006.01)
*H04N 9/77* (2006.01)

(52) U.S. Cl.
CPC ............... *G03B 15/00* (2013.01); *H04N 5/235* (2013.01); *H04N 5/33* (2013.01); *H04N 5/332* (2013.01); *H04N 9/07* (2013.01); *H04N 9/67* (2013.01); *H04N 9/77* (2013.01)

(56) References Cited

U.S. PATENT DOCUMENTS

| 8,138,466 | B2 | 3/2012 | Hosaka | |
| 2006/0261280 | A1* | 11/2006 | Oon | H04N 5/2256 250/370.08 |
| 2007/0153099 | A1* | 7/2007 | Ohki | H04N 5/332 348/234 |
| 2007/0187794 | A1* | 8/2007 | Fukuyoshi | G02B 5/223 257/440 |
| 2008/0049115 | A1* | 2/2008 | Ohyama | H04N 5/2224 348/222.1 |
| 2008/0283729 | A1 | 11/2008 | Hosaka | |

FOREIGN PATENT DOCUMENTS

| JP | 2004-146873 A | 5/2004 |
| JP | 2007-184805 A | 7/2007 |
| JP | 2007-257304 A | 10/2007 |
| JP | 2008-252639 A | 10/2008 |
| JP | 2009-253857 A | 10/2009 |
| JP | 2010-063065 A | 3/2010 |
| JP | 2010-98358 A | 4/2010 |
| JP | 2010-191520 A | 9/2010 |
| WO | WO 2010/053029 A1 | 5/2010 |

* cited by examiner

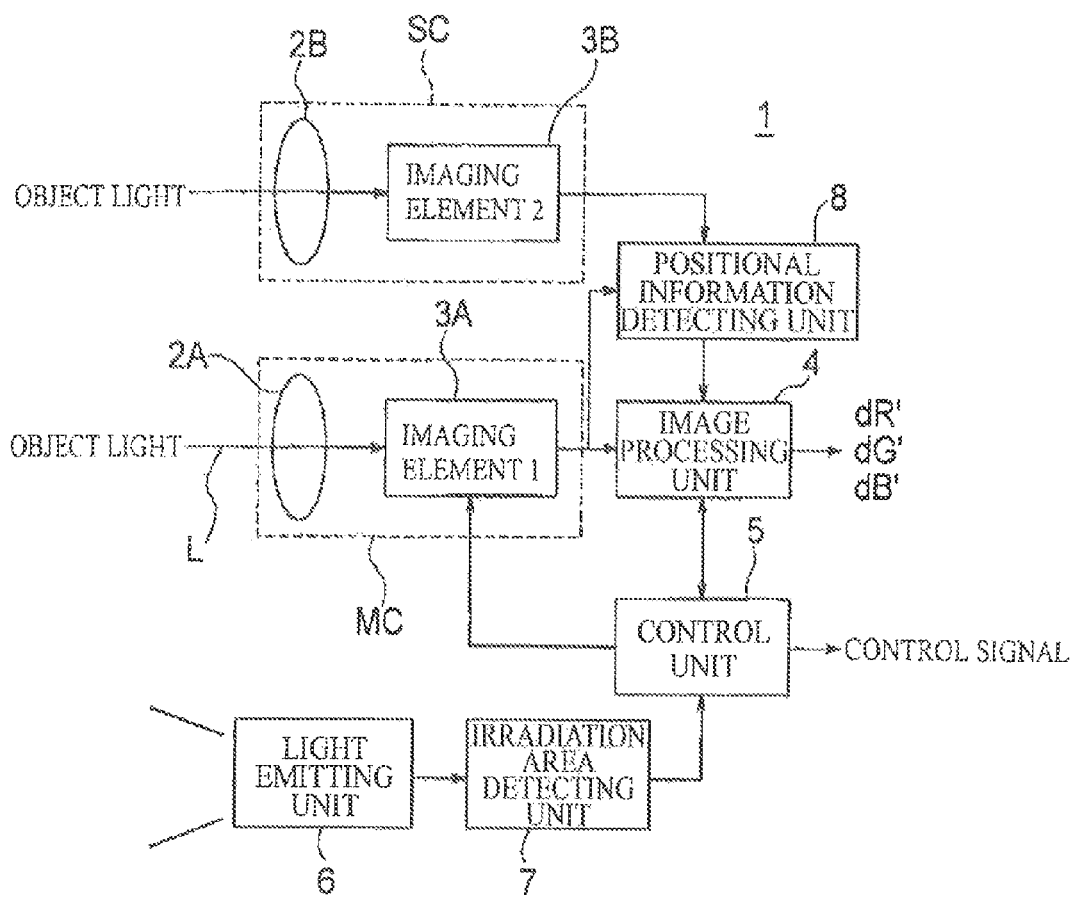

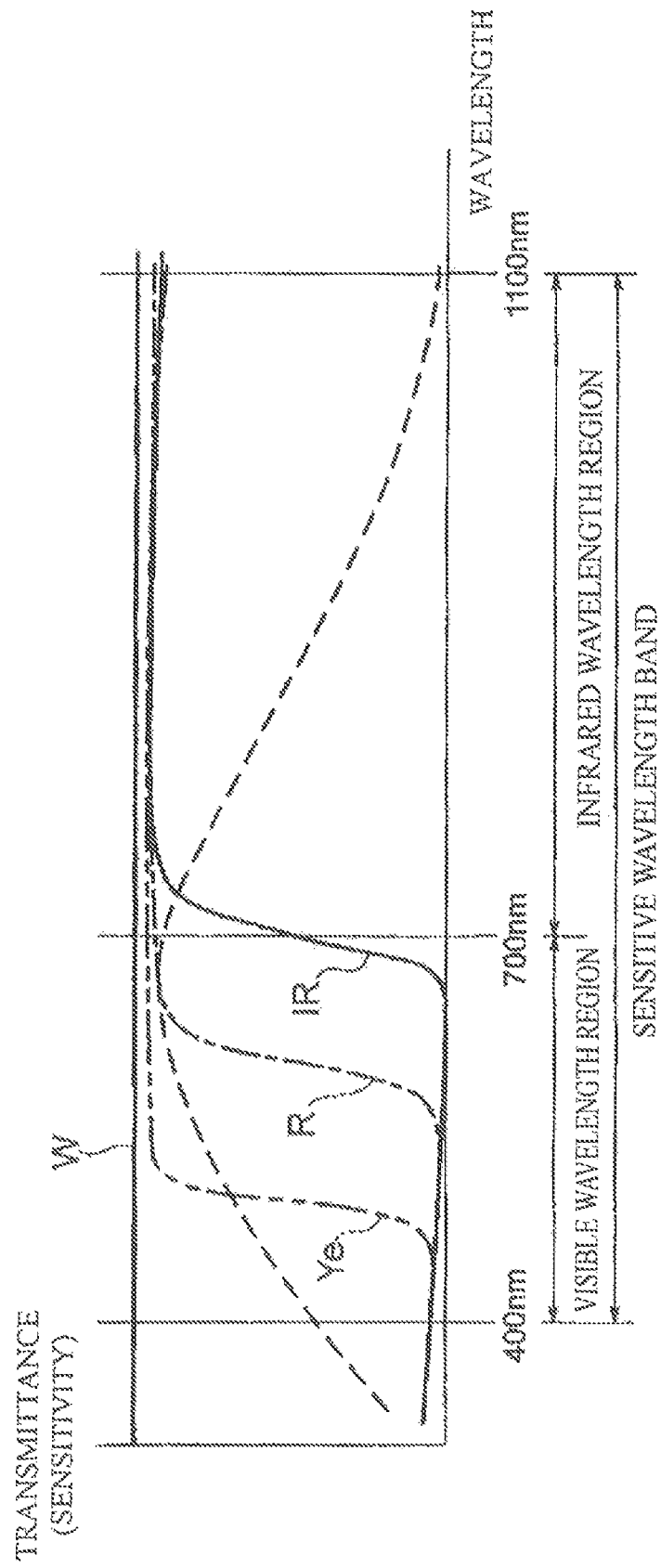

FIG. 19
(a)
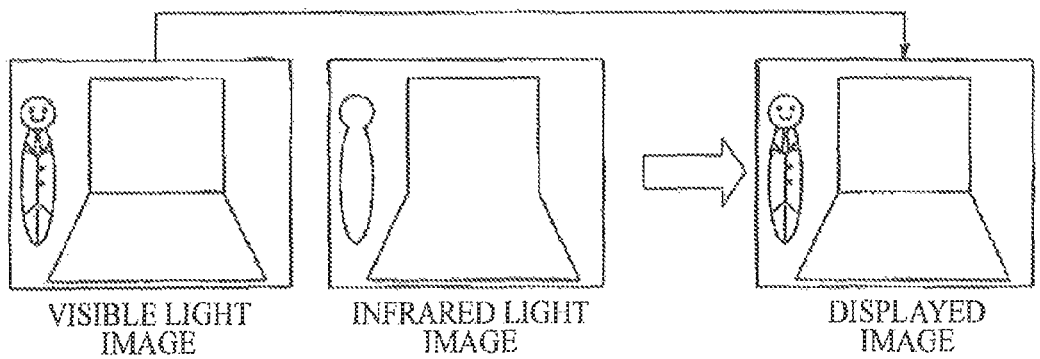
(b)
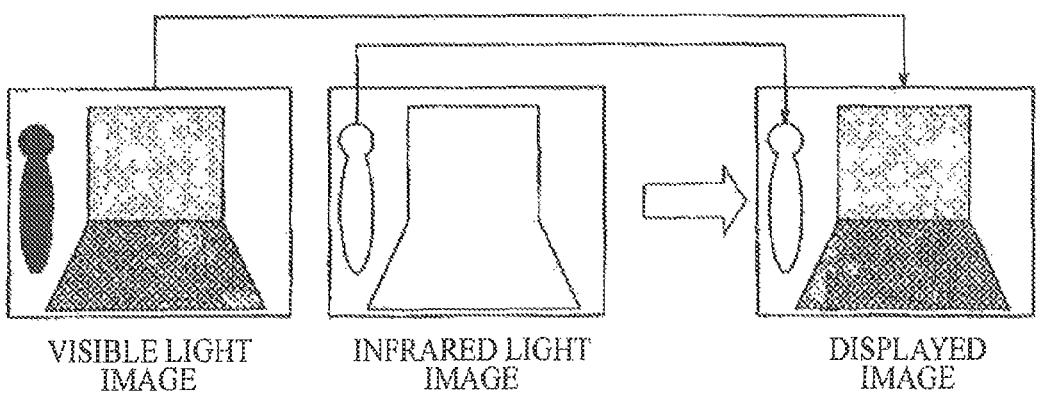
(c)
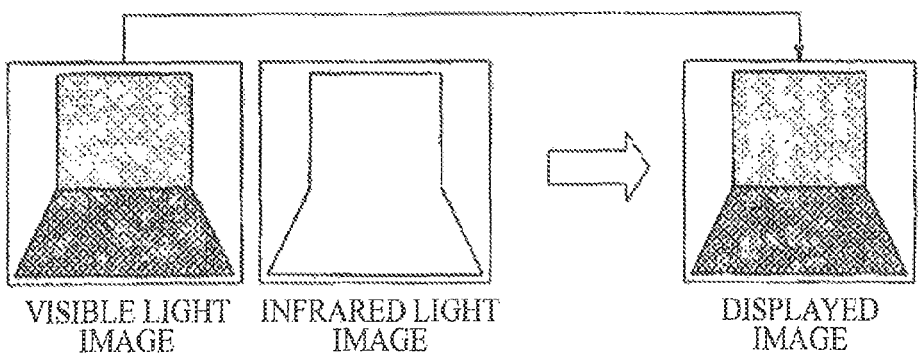

EXAMPLE OF FUNCTION f(d)

IMAGE INPUT DEVICE AND IMAGE PROCESSING DEVICE

CROSS REFERENCE TO RELATED APPLICATION

This Application is a 371 of PCT/JP2011/076049 filed on Nov. 11, 2011, which claimed the priority of Japanese Patent Application No. 2010-255683 filed on Nov. 16, 2010 and Japanese Patent Application Nee 2011-006657 filed Jan. 17, 2011; all three applications are incorporated herein by reference in its entirety.

TECHNICAL FIELD

The present invention relates to image input devices for performing image processing of original image data whose images are picked up by imaging elements, and image processing devices including the imaging elements and, more particularly, to an image processing device capable of forming an image emphasizing a predetermined object even when luminance of the object is low.

BACKGROUND ART

With regard to images of an onboard camera and a security camera capable of photographing at nighttime, technology to show up an object and display it in color even at nighttime, by projecting visible light and infrared light, and picking up images by a visible sensor having a sensitivity in a visible region and an infrared sensor having a sensitivity in an infrared region, is known. Patent Document 1, for example, discloses an image signal processing apparatus in which a parameter, allowing an infrared light component contained in a signal passing through a visible light transmissive long pass filter to become almost zero, is calculated by applying transmittance data in an infrared light region of the visible light transmissive long pass filter and of an infrared light transmissive long pass filter, and the infrared light component contained in the signal passing through the visible light transmissive long pass filter is removed by applying the calculated parameter, so as to generate a visible light (RGB) image with high quality.

Meanwhile, Patent Document 2 discloses an image input device having an imaging element, in which at least three kinds of pixels having different spectral sensitivities are arranged, for picking up an image of original image data containing at least three types of original image components, and a color space converting unit for converting the original image data into color space containing a luminance signal and a chromaticity signal, so as to obtain a clear color image even at nighttime by using a visible light component and an infrared light component obtained from the imaging element.

Moreover, the so-called back view camera is known, which can photograph, the rear of a vehicle in order to support driving of the vehicle in reverse. An image photographed by the back view camera is displayed on a display device near a driver's seat, and visually confirmed by a driver and the like, so as to ensure safety. Under a relatively high luminance environment such as during daytime, obstacles including humans and animals can be visually confirmed as visible light images with ease. However, under a low luminance environment such as during nighttime, there is a problem that the obstacles including the humans and the animals are hardly confirmed visually due to the low luminance of the visible light images. It should be noted that similar problems are caused in the security cameras and the like.

In view of the problem like this, such technology has also been developed as to display an image with improved visibility even under the low luminance environment on the display device by irradiating the rear of an automobile with infrared, light by an infrared LED mounted on the vehicle, photographing the rear of the vehicle by using a near-infrared camera, and performing image processing of the photographed image. However, the infrared light is strongly reflected from a concrete wall and the surface of an asphalt pavement in the infrared light image displayed on the display device. Therefore, when the obstacle such as the human and the animal is photographed with such a background, the infrared light image overlaps the infrared light image of the wall or the surface, which causes flared highlights and results in a problem that visual confirmation of the obstacle becomes difficult.

In response to this, Patent Document 3 discloses a photographing device configured to be able to switch between an infrared photographing mode for photographing while performing infrared light irradiation and a normal photographing mode for photographing without performing infrared light irradiation. The photographing device is configured to set the luminance of a criterion color as criterion color luminance and the luminance of a reference color as reference color luminance, and to switch the infrared photographing mode to the normal photographing mode when a ratio of the criterion color luminance to the reference color luminance exceeds a predetermined range.

Meanwhile, Patent Document 4 discloses such technology that a rear view display device picks up a visible light image and a near infrared light image separately, and displays the visible light image except when the image is automatically switched to the image by the near infrared light at the time when it is sensed that headlights are turned on by ON/OF information of the headlights.

DOCUMENT OF PRIOR ART

Patent Document

Patent Document 1: Japanese Patent Application Publication No. 2008-288629
Patent Document 2: Japanese Patent Application Publication No. 2010-63065
Patent Document 3: Japanese Patent Application Publication No. 2004-146873
Patent Document 4: Japanese Patent Application Publication No. 2003-104121

DISCLOSURE OF INVENTION

Problems to be Solved by Invention

When the technology according to the Patent Documents 1 and 2 is used, it is possible to obtain a colorized image by giving a change in light and shade (luminance change) to a part that is hardly recognized by the human eye conventionally, and by enhancing a small amount of chromaticity information according to the luminance change. This makes it possible to instantaneously display on a monitor an obstacle or the like that is in front of the vehicle and is difficult to be observed visually.

However, there are problems that cannot be solved by the conventional technology. At a short distance where enough visible information can be obtained, for example, the infrared sensor acquires infrared information, which may cause the luminance to become too nigh and a part of the pixels in the imaging element to be saturated, as a result of which color information is lost. Further, when the object is at a distance where the visible information can be hardly obtained, there are possibilities that chromaticity noise increases as a small amount of color information, is enhanced and that the color changes significantly from pixel to pixel. Moreover, as a light emitting object such as a signal, a streetlight, and the like may include a large amount of infrared light components in emitted light, the luminance signal increases when the infrared sensor acquires the components, resulting in a problem that red/green/yellow signals are displayed as white (referred to as flared highlights). Namely, although the conventional technology can form the image colorizing a part that, is hardly recognized by the naked eye, there are problems including inaccuracy in luminance reproduction and chromaticity reproduction, and large amounts of noise. On the other hand, it may not be necessary to clearly identify some objects at the time of drive support of the vehicle, for example. The problems of the conventional technology are summarized in Table 1.

TABLE 1

Problems of visible + infrared sensor

| Item | Ideal | Problem |
| --- | --- | --- |
| Signal, signpost | Reproduced as it appears Color can be recognized | Flared highlights Color of signal is pale |
| Obstacle, human, car, bicycle | More clearly | In darkness not displayed in image |
| Noise | Less | Deterioration of color noise |

It is an object of the present invention to provide an image input device capable of obtaining a luminance signal and a chromaticity signal appropriately even when photographing at nighttime.

According to the conventional technology in the Patent Document 3, the image plane is switched frequently between the infrared photographing mode and the normal photographing mode when a luminance ratio is in the vicinity of a threshold value, and consistency in the luminance cannot be maintained between preceding and succeeding frames, resulting in such a problem that an observer who visually confirms the image will have a feeling of strangeness.

Further, according to the conventional technology in the Patent Document 4, when the switching is made to the image by the near infrared light and when there are many objects that strongly reflect the infrared light, the flared highlights is caused in most of the image plane, resulting in such a problem that the visual confirmation is rather difficult.

The present invention is made in view of the above-described problems, and it is an object of the present invention to provide an image processing device capable of forming an image in which an object can be confirmed visually even under the low luminance environment.

Solution to Problems

An image input device according to the present invention includes
a positional information acquiring unit for acquiring positional information including at least one of a height of an object and a distance to the object,
imaging means having at least three kinds of arranged pixels with different spectral sensitivities, to convert an incident object image into original image data having at least three kinds of original image components including a visible light component and an infrared light component, and
a color space converting unit which performs weighting to the visible light component and the infrared light component on the basis of the positional information acquired by the positional information acquiring unit, to convert the original image data into color space including a luminance signal and a chromaticity signal adjusted on the basis of weighted visible light component and the infrared light component.

According to the present invention, the color space converting unit performs weighting to the visible light component and the infrared light component on the basis of positional information acquired by the positional information acquiring unit to convert the original image data into the color space including the luminance signal and the chromaticity signal. Thus, it is possible to obtain the appropriate color space according to the height of the object and the distance to the object, and to obtain space characteristics which have excellent reproducibility of luminance and chromaticity, have less noise, and are able to make a less-visible object more visible, and to realize natural reproduction. Incidentally, adjustment of at least one of the luminance signal and the chromaticity signal will suffice.

Further, according to an aspect of the present invention, it is preferable that the color space converting unit decreases the weight of the infrared light component in the luminance signal when it is determined that the height of the object is higher than a predetermined value according to the positional information. The reason is that, when the height of the object is high, the possibility of the object being a signal or the like is high, and flared highlights should be suppressed to thereby reproduce an original color of a lamp.

Further, according to an aspect of the present invention, it is preferable that the color space converting unit decreases the weight of the infrared light component in the luminance signal when it is determined that the distance to the object is smaller than a predetermined value according to the positional information. The reason is that, when the distance to the object is small, the visible information becomes effective even in the case of the night photographing, and therefore, it is desirable that the infrared light component is suppressed.

Further, according to an aspect of the present invention, it is preferable that the luminance signal is subjected to edge enhancement processing when it is determined that the height of the object is lower than a predetermined value according to the positional information. When the height of the object is low, the possibility of the object being a human or the like is high, and therefore, it is desirable that visual confirmation can be made clear.

Further, according to an aspect of the present invention, it is preferable that the luminance signal is passed through a low-pass filter when it is determined that the height of the object is higher than a predetermined value according to the positional information. The reason is that, when the height of the object is high, the possibility of the object being a tree or the like is high, and therefore, clearness is not necessary. The effect of showing up the sharpened human or the like can be realized. Also, even when the high object is the signal, its shape may be unclear as long as the color of the lamp can be identified.

Further, according to an aspect of the present invention, it is preferable that the color space converting unit increases the weight of the visible light component in the chromaticity signal when it is determined that the height of the object is higher than a predetermined value according to the positional information. When the height of the object is high, the possibility of the object being a signal or the like, and therefore, it is desirable that the original color of the lamp is reproduced.

Further, according to an aspect of the present invention, it is preferable that the color space converting unit decreases the weight of the visible light component in the chromaticity signal when it is determined that the distance to the object is smaller than a predetermined value according to the positional information. When the height of the object is low, the possibility of the object being a human or the like, and therefore, it is desirable that the visibility is improved rather than reproducing a color of clothing.

Further, according to an aspect of the present invention, it is preferable that the chromaticity signal is subjected, to edge enhancement processing when it is determined that the distance to the object is smaller than a predetermined value according to the positional information. The reason is that, when the distance to the object is small, the visible information becomes effective even in the case of the night photographing.

Further, according to an aspect of the present invention, it is preferable that the chromaticity signal is passed through a low-pass filter when it is determined that the distance to the object is greater than a predetermined value according to the positional information. Thus, the chromaticity noise can be reduced. Furthermore, when the distance to the object is greater, the infrared information becomes more effective than the visible information, and therefore, the color information can be used effectively.

Further, according to an aspect of the present invention, it is preferable that the chromaticity signal is subjected to enhancement processing when it is determined that the height of the object is higher than a predetermined value according to the positional information. The reason is that, when the height of the object is high, the possibility of the object being a signal or the like is high, and therefore, it is necessary to reproduce the original color of the lamp.

Further, according to an aspect of the present invention, it is preferable that the chromaticity signal is subjected to suppression processing when it is determined that the height of the object is lower than a predetermined value according to the positional information. Thus, the chromaticity noise can be reduced. Further, the reason is that, when the height of the object is low, the possibility of the object being a human or the like, and therefore, it is necessary to improve visibility rather than reproducing the color of clothing.

Further, according to an aspect of the present invention, it is preferable that the chromaticity signal is subjected to suppression processing when it is determined that the distance to the object is greater than a predetermined value according to the positional information. Thus, the chromaticity noise can be reduced. Furthermore, the reason is that, when the distance to the object is greater, the infrared information becomes more effective than the visible information.

Further, according to an aspect of the present invention, it is preferable that the chromaticity signal is subjected to enhancement processing when it is determined that the distance to the object is smaller than a predetermined value according to the positional information. When the distance to the object is small, the visible information becomes effective even in the case of the night photographing, and therefore, the color information can be used effectively.

Further, according to an aspect of the present invention, it is preferable that the image input device further includes light emitting means for carrying out irradiating with visible light and infrared light, and irradiation area calculating means for calculating an irradiation area where irradiation light from the light emitting means reaches. When the front on driving at nighttime is irradiated by headlamps of the vehicle, for example, the irradiation area calculating means calculates an area to be irradiated, so that a higher priority can be given to the visible information within the irradiation area, and a higher priority can be given to the infrared information outside the irradiation area. This makes it possible to obtain the positional information with high accuracy, and to display an object image appropriately.

Further, according to an aspect of the present invention, it is preferable that the color space converting unit performs weighting and adding of the luminance signal depending on the visible light component and the luminance signal depending on the infrared light component to obtain a new luminance signal. Thus, balance of the luminance chromaticity can be maintained.

An image processing device according to the present invention includes imaging means for acquiring a visible light component and an infrared light component from an object to form visible light image data and infrared light image data, storage means for storing luminance information of a plurality of types of the objects, extracting means for extracting the infrared light image data of a corresponding object from the infrared light image data based on the luminance information stored in the storage means, and synthesizing means for performing synthesis so that the infrared light image data of the object extracted by the extracting means is pasted onto a visible light image based on the visible light image data.

According to the present invention, the extracting means extracts the infrared light image data of the corresponding object from the infrared light image data on the basis of the luminance information stored in the storing means, and the synthesizing means performs the synthesis so that the infrared light image data of the object extracted by the extracting means is pasted onto the visible light image based on the visible light image data. Thus, the synthesized image is displayed, whereby the infrared light image of the object, whose luminance information is stored, is pasted onto the visible light image having low luminance, for example, and can be displayed with emphasis, so that the visibility is improved.

According to another aspect of the present invention, the synthesis by the synthesizing means is performed when average luminance in the visible light image before the synthesis is lower than a predetermined value. Thus, it is effective when used in the night photographing during which the visibility is particularly low.

According to another aspect of the present invention, the image processing device further includes displaying means for displaying an image synthesized by the synthesizing means. Thus, it is possible to display the image.

According to another aspect of the present invention, the displaying means displays the visible light image based on the visible light image data when, the average luminance in the visible light image before the synthesis is equal to or higher than the predetermined value. When the average luminance is equal to or higher than the predetermined value, the visible light is dominant, and hence, visual confirmation can be made sufficiently without using the infrared light image.

According to another aspect, of the present invention, the displaying means displays an infrared, light image based on the infrared light image data when the average luminance in the visible light image before the synthesis is lower than the predetermined value, and when the corresponding object does not exist in the infrared light image on the basis of luminance information. This is because, when the object whose luminance information is stored does not exist, a target to be emphasized does not exist, even when the average luminance is lower than the predetermined value.

According to another aspect of the present invention, the luminance information of the object stored in the storing means is determined by the luminance information of the same object in the visible light image. Since the luminance information of the same object is approximate in the visible light image and in the infrared light image, it is possible to identify the same object in the infrared light image by using, for example, the luminance information of the visible light image.

According to another aspect of the present invention, the image processing device further includes distance measuring means for detecting a distance to the object, wherein, when there is a plurality of corresponding objects in the infrared light image on the basis of luminance information, the synthesizing means performs the synthesis so that, the infrared light image of a nearest object is pasted onto the visible light image. This is preferable because, when the present invention is applied to an image acquired from the back view camera or the like of the vehicle, for example, the nearest object, to which the most attention should be paid when driving in reverse, can be displayed with emphasis.

According to another aspect of the present invention, the image processing device further includes the distance measuring means for detecting the distance to the object, wherein, when there is a plurality of corresponding objects in the infrared light image on the basis of luminance information, the synthesizing means performs the synthesis so that the infrared light images with different luminance according to the distance to the object is pasted onto the visible light image. This is preferable because, when the present invention is applied to the image acquired from the back view camera or the like of the vehicle, for example, the greatest emphasis can be placed on the nearest object in the display, to which the most attention should be paid when driving in reverse, and the emphasis gradually decreases as the distance increases.

When the object is the human, for example, "the luminance information of the object" can be obtained by a method of detecting the human by using an edge histogram from the visible light image (N. Dalal, et. al.: Histogram of oriented gradient for human detection. CVPR2005). According to this method, a gradient histogram in a certain region is calculated. Specifically, the calculation method includes the following steps.
Step 1: Finding gradient strength and orientation of the luminance from each pixel (picture element).
Step 2: Dividing N×N pixels as one cell and 0°-180° into nine directions each having 20°, and forming a luminance gradient histogram for each cell.
Step 3: Normalizing the histogram formed for each cell by setting 3×3 cells as one block. Performing normalization of the entire region while shifting the blocks by one cell.

A feature value can be obtained from the above. Alternatively, the human may be determined by edge strength in the visible light image according to technology described, in Japanese Patent Application Publication No. 2007-264887. It should be noted that the object may be the humans, the animals, or non-living objects.

Effect of Invention

According to the image input device of the present invention, it is possible to obtain the luminance signal and the chromaticity signal appropriately even when photographing at nighttime.

According to the image processing device of the present invention, the specific object that cannot be identified with the visible light is displayed by the infrared light image, so that the image display without flared highlights and with excellent visibility can be realized, and the visibility can be improved.

BRIEF DESCRIPTION OF THE DRAWINGS

FIG. 1 is a block diagram of an image input device 1 according to a first embodiment;

FIG. 2 is a view showing a pixel array in imaging elements 3A and 3B;

FIG. 3 is a view showing spectral transmission characteristics of Ye, R, and IF filters, with its longitudinal axis showing a transmittance (sensitivity) and horizontal axis showing a wavelength (nm);

FIG. 12 is a view comparing heights of a signal, a human and the like;

FIG. 17 are views showing states how images photographed by the image processing device 100 of this embodiment are displayed on a display device 110, in which FIG. 17(a) is a visible light image at daytime, FIG. 17(b) is a visible light image at nighttime, and FIG. 17(c) is an infrared, light image at nighttime, with dotted, lines in FIG. 17(b) and FIG. 17(c) not being visible in actuality;

FIG. 19 are views for explaining processing details performed by the image processing device 100 according to this embodiment, in which FIG. 19(a) is an example displaying a visible light image, FIG. 19(b) is an example displaying a synthesized image, and FIG. 19(c) is an example displaying an infrared light image;

EMBODIMENT FOR CARRYING OUT THE INVENTION

First Embodiment

Figure 4:
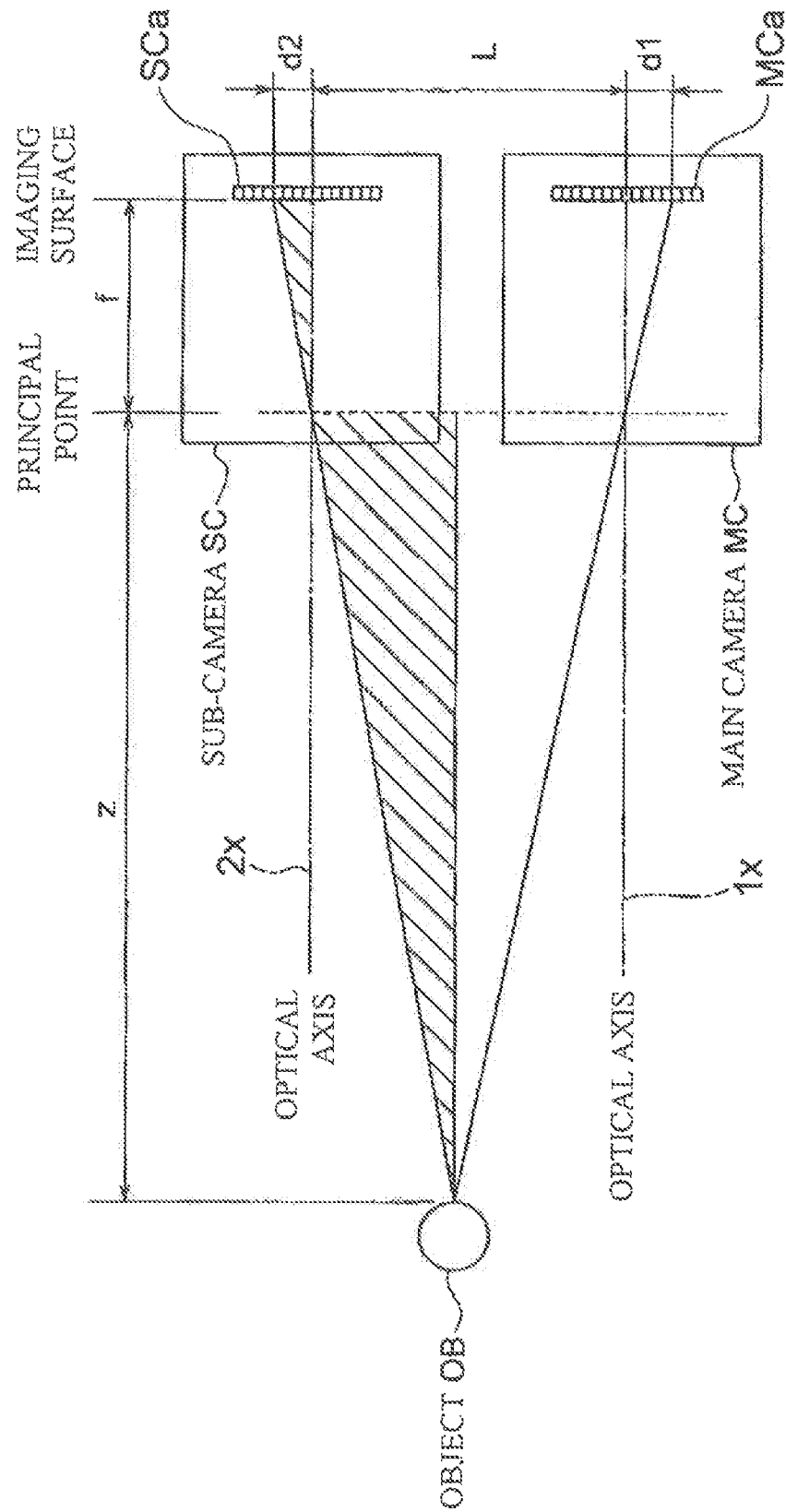
FIG. 4 is a view showing a principle of measuring distance information to an object by using a main camera MC and a sub-camera SC.

Hereinafter, an image input device 1 according to a first embodiment of the present invention will be explained. FIG. 1 is a block diagram of the image input device 1 according to this embodiment. As shown in FIG. 1, the image input device 1 includes a main camera MC, a sub-camera SC, an image processing unit 4, and a control unit 5 serving as imaging means, a light emitting unit 6 of infrared light and visible light serving as light emitting means, an irradiation area detecting unit (irradiation area calculating means) 7 that detects an area irradiated by the light emitting unit, and a positional information detecting unit (positional information acquiring unit) 8. The main camera MC has a lens 2A and an imaging element 3A, and the sub-camera SC has a lens 2B and an imaging element 3B. The image input device 1 is mounted on a vehicle, for example, and is used for picking up images of an object around the vehicle.

As the sub-camera, the one same as the main camera MC may be used, or a camera having different configuration may be used. In order to maintain positional precision, it is preferable to use the same camera because positional displacement is not caused. Any other means may be used, not only stereo matching using the two cameras, as long as positional information can be found.

The lenses 2A and 2B are constituted by optical lens systems that take in optical images of the object and direct these to the imaging elements 3A and 3B, respectively. As the optical lens system, for example, a zoom, lens, a focus lens, a fixed lens block and others, serially arranged along an optical axis of the optical image of the object, may be employed. Each of the lenses 2A and 2B includes an aperture (not illustrated), a shutter (not illustrated) and the like for adjusting an amount of transmitted light, and driving of the aperture and the shutter is controlled by the control of the control unit 5.

Each of the imaging elements 3A and 3B includes a light receiving unit formed by a PD (photodiode), an output circuit to output a signal that is subjected to photoelectric conversion by the light receiving unit, and a drive circuit to drive the imaging elements 3A and 3B, and generates original image data having a level corresponding to a light amount. As the imaging element 3, various imaging sensors including a CMOS image sensor, a VMIS image sensor, a CCD image sensor and the like may be employed.

According to this embodiment, the imaging elements 3A and 3B, on which the optical image of the object is incident, converts and outputs a visible color image component by a pixel including a color filter, converts and outputs an infrared image component by a pixel including an infrared filter, and converts and outputs a luminance image component, including a visible luminance image component, and the infrared image component by a pixel not including a filter.

The image processing unit 4 includes an arithmetic circuit and a memory and the like used as workspace of the arithmetic circuit, subjects the original image data outputted from the imaging elements 3A and 3B to A/D conversion to convert the data into digital signals, executes later-described image processing, and, outputs these to, for example, a memory or a display device, illustration of which is omitted. Incidentally, the image signal of the main camera MC is used for the image processing, and the image signal of the main camera MC and the image signal of the sub-camera SC are used for detecting distance information of the object.

The control unit 5 includes a CPU, a memory to store programs executed by the CPU and the like, and controls the image input device 1 as a whole in response to a control signal from the outside. The light emitting unit 6 is headlamps of the vehicle, for example, which can be switched between low beam and high beam, and the irradiation area detecting unit 7 can detect the area irradiated by the light emitting unit 6 according to a beam switching switch (not illustrated) or the like. The positional information detecting unit 8 detects the positional information of the object as will be described later.

FIG. 2 is a view showing a pixel array in the imaging elements 3A and 3B. As shown in FIG. 2, the imaging elements 3A and 3B have unit pixel parts 31 arranged in a matrix form, each including a Ye pixel (first pixel), an R pixel (second pixel), an IR pixel (third pixel) and a W pixel (fourth pixel), whose sensitive wavelength band is a visible wavelength region and an infrared wavelength region. Incidentally, the "Ye" pixel, for example, means the pixel having a "Ye" filter, and the same shall apply hereinafter.

In FIG. 2, the R pixel is arranged in the first, row and the first column, the IR pixel is arranged in the second row and the first column, the W pixel is arranged in the first row and the second column, and the Ye pixel is arranged in the second row and the second column in the unit pixel part 31, that is, the R pixel, the IR pixel, the W pixel, and the Ye pixel are arranged in a zigzag manner. It should be noted that this is only an example, and the R pixel, the IR pixel, the W pixel, and the Ye pixel may be arranged according to a different zigzag pattern.

Because the Ye pixel includes the Ye filter (first color filter), it outputs an image component Ye (original image component) as a Ye visible color image component and the infrared image component. Because the R pixel includes an R filter (second color filter), it outputs an image component R (original image component) as an R visible color image component, and the infrared image component. Because the IR pixel includes an IR filter (infrared filter), it outputs an image component IR (original image component) as the infrared image component. Because the W pixel does not include the filter, it outputs an image component W (original image component) as the luminance image component including the visible luminance image component and the image component IR.

FIG. 3 is a view showing spectral transmission characteristics of the Ye, R, and IR filters, with its longitudinal axis showing a transmittance (sensitivity) and horizontal axis showing a wavelength (nm). Incidentally, a graph by a dotted line shows a spectral sensitivity characteristic of a pixel when the filter is removed. It is clear that this spectral sensitivity characteristic reaches its peak around 600 nm, and changes in a curve protruding upward. In FIG. 3, the visible wavelength region is from 400 nm to 700 nm, the infrared wavelength region is from 700 nm to 1100 nm, and the sensitive wavelength band is from 400 nm to 1100 nm.

As shown in FIG. 3, the Ye filter has a characteristic of transmitting light in the sensitive wavelength band except for a blue region in the visible wavelength region. Therefore, the Ye filter mainly transmits yellow light and the infrared light.

The R filter has a characteristic of transmitting light in the sensitive wavelength band except for the blue region and a green region in the visible wavelength region. Therefore, the R filter mainly transmits red light and the infrared light.

The IR filter has a characteristic of transmitting light in the sensitive wavelength band except for the visible wavelength region, that is, light in an infrared wavelength band. W shows the case where the filter is not provided, and any light in the sensitive wavelength band of the pixel is transmitted.

Similar characteristics can be realized by Ye, M (magenta)+IR, and C (cyan)+IR (incidentally, M+IR blocks green only, and C+IR blocks red only), instead of Ye, R, and IR. However, it is possible for the R pixel, the IR pixel, and the Ye pixel to sharpen the spectral transmission characteristics, and to exhibit the excellent spectral transmission characteristics as compared with the case when, for example, the M+IR filter and the C+IR filter are used. Namely, the M+IR filter and the C+IR filter have the characteristics of blocking the green region and the red region, each of which is a part of the regions at the center of the sensitive wavelength band, and therefore it is difficult for such filters to have the sharp spectral transmission characteristics that are similar to those of the R filter, the IR filter, and the Ye filter. For this reason, RGB image components cannot be extracted accurately by operation of the M+IR filter and the C+IR filter. Thus, performance of the imaging element 3 can be improved by forming the imaging element 3 by the R pixel, the IR pixel, the Ye pixel, and the W pixel.

FIG. 4 is a view showing a principle of measuring distance information to the object by using the main camera MC and the sub-camera SC. In FIG. 4, the main camera MC and the sub-camera SC including a pair of imaging elements are arranged while leaving space therebetween by a predetermined base line interval L and allowing their optical axes to be parallel to each other. With regard to images of the object that are picked up by the main camera MC and the sub-camera SC, corresponding point searching is performed by the pixel using a SAD (Sum of Absolute Difference) method as a corresponding point searching method, for example, so as to find parallax with respect to a target, in the horizontal direction between the main camera MC and the sub-camera SC and, based on the found parallax, to find a distance Z to the object according to the following formula. It should be noted that, when using the camera having the above-described W, Ye, R, and IR filters, the respective images are changed into luminance (gray scale) images in order to find the distance information. The following formula may be used for gray-scaling, similarly to the conventional cases.

$$\text{Gray scale} = (W + Ye + R + IR)/4$$

In FIG. 4, the two cameras of the main camera MC and the sub-camera SC, whose focal distances (f), pixel numbers of imaging elements (CCDs) and sizes ($\mu$) of one pixel are at least equal to each other, are used to photograph an object OB while leaving the space therebetween by the predetermined base line interval (L) in the horizontal direction, and allowing optical axes 1X and 2X to be parallel to each other. Supposing that, in the example shown in FIG. 4, a pixel number (counted from the left edge or the right edge) at the edge of the object OB on an imaging surface MCa of the main camera MC is x1, and a pixel number at the edge of the same object OB on an imaging surface SCa of the sub-camera SC is x2 (supposing that y is equal), the parallax (number of shifted pixels) on the imaging surfaces MCa and SCa is d (=x1−x2). With respect to a distance (Z) to the object OB, triangles, one of which is diagonally shaded, are similar. Therefore, the positional information detecting unit 8 uses the relationship of:

$$Z{:}f = L{:}\mu \times d$$

to find the distance (Z) by:

$$Z = (L \times f)/(\mu \times d) \qquad (1)$$

Figure 5:
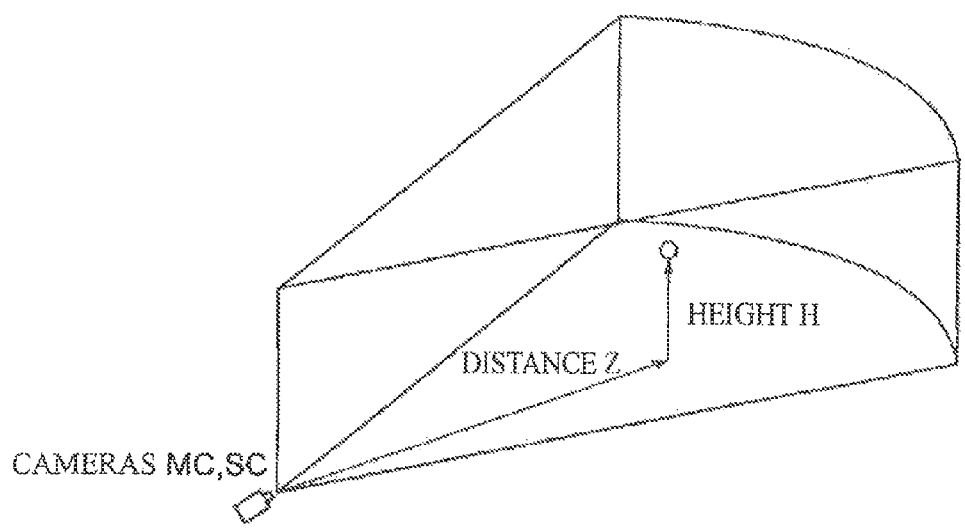
FIG. 5 is a view showing a state of acquiring positional information by the cameras.

Further, according to technology described in Japanese Unexamined Patent Application Publication No, 2009-239485, for example, it is possible to find a height H of the object, from the image information of the main camera MC and the sub-camera SC (refer to FIG. 5).

Figure 6:
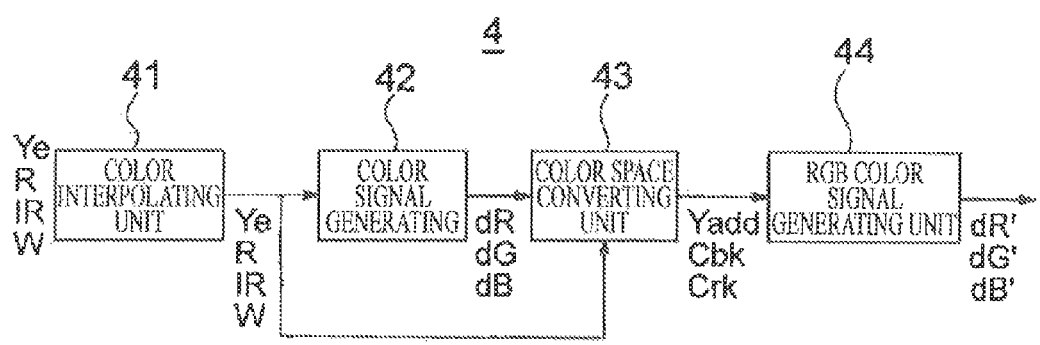
FIG. 6 is a block diagram showing configuration of an image processing unit 4 in detail.

FIG. 6 is a block diagram showing configuration of the image processing unit 4 in detail. The image processing unit 4 includes a color interpolating unit 41, a color signal generating unit 42, a color space converting unit 43, and an RGB color signal generating unit 44.

Comparative Example

Figure 7:
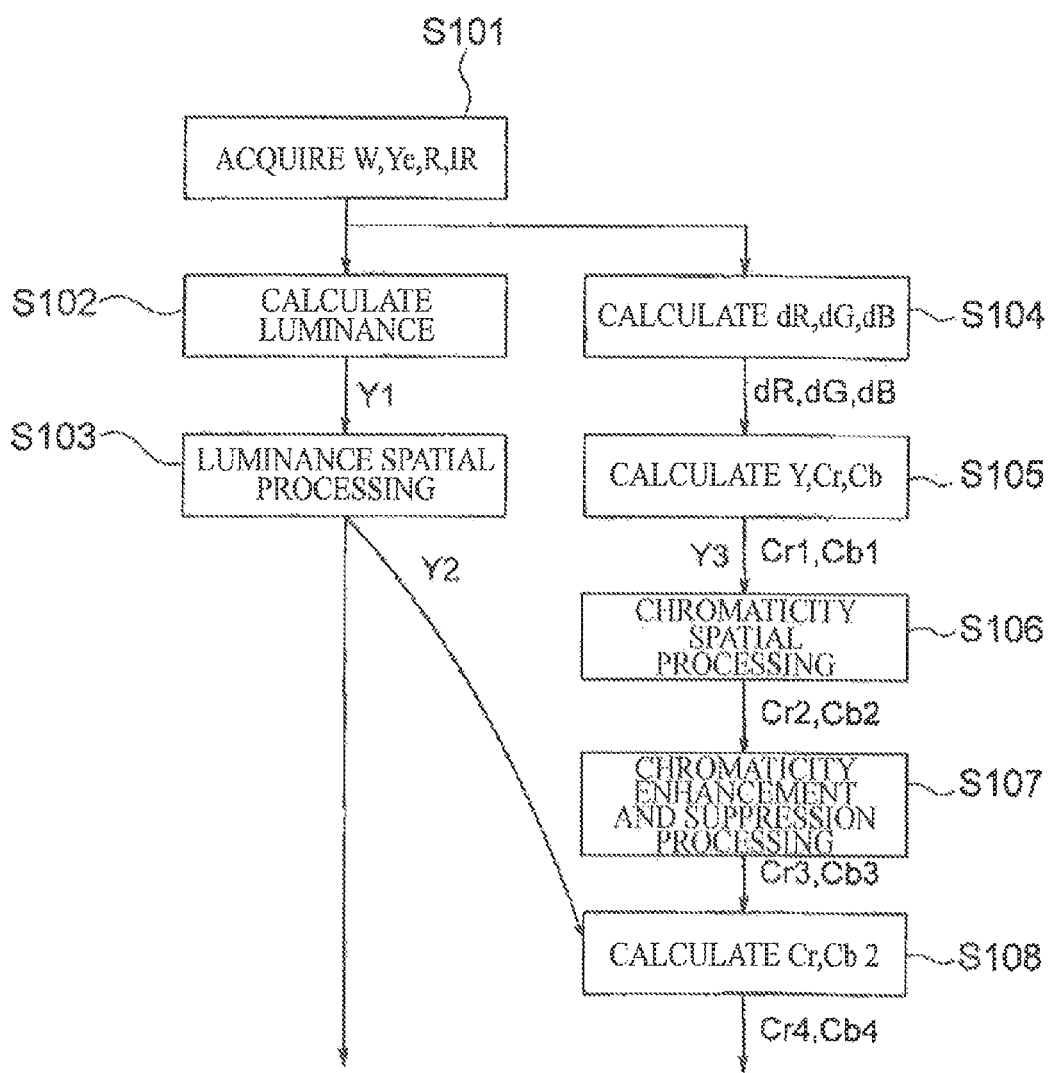
FIG. 7 is a flowchart showing operation of a comparative example.

How, the image processing according to a comparative example will be explained with reference to a flowchart of FIG. 7. In a step S101 in FIG. 7, the color interpolating unit 41 subjects the image component Ye, the image component R, the image component IR, and the image component W, which are outputted from the imaging element 3A, to interpolation processing for interpolating missing pixel data, respectively, and allows the image component R, the image component IR, the image component W, and the image component Ye to be the image data having the same pixel number as the pixel number of the imaging element 3A. Incidentally, the missing pixel data is caused in the image components Ye, R, IR, and W because the R pixel, the IR pixel, the W pixel, and the Ye pixel are arranged in the zigzag manner. For the interpolation processing, for example, linear interpolation processing may be employed.

In a step S102, the color space converting unit 43 calculates a luminance signal Y1 that is obtained by adding the image components Ye, R, IR, and W as a luminance signal of color space to be converted, as shown by the formula (1):

$$Y1 = (¼) \times (R + IR + W + Ye) \qquad (1)$$

In this case, the luminance signal Y1 is calculated by the adding processing, and therefore a noise component can be reduced as compared, with the case when the luminance signal is calculated by subtracting processing.

In a step S103, the color space converting unit 43 performs luminance spatial processing. More specifically, it allows the luminance signal Y1 to pass through a low-pass filter for blurring, and to edge enhancement processing for sharpening. Thus-obtained luminance signal is regarded as Y2.

At the same time, in a step S104, the color signal generating unit 42 combines the image component Ye, the image component R, the image component IR, and the image component W that are subjected to the interpolation processing by the color interpolating unit 41, by using the following formulae (2), to generate color signals dR, dG, and dB (RGB color signals).

$$dr = R - IR$$

$$dG = Ye - R$$

$$dB = W - Ye \qquad (2)$$

In a step S105, the color space converting unit 43 converts the color signals dR, dG, and dB into color space including a luminance signal Y3 and color-difference signals Cb1 and Cr1, as shown in following; formulae (3). Here, the color-difference signal Cb1 means a blue color-difference signal and the color-difference signal Cr1 means a red color-difference signal.

$$Y3 = 0.3 \times dR + 0.6 \times dG + 0.1 \times dB$$

$$Cb1 = dR - Y3$$

$$Cr1 = dB - Y3 \qquad (3)$$

In a step S106, the color space converting unit A3 performs chromaticity spatial processing. More specifically, it allows the color-difference signals Cb1 and Cr1 to pass through the low-pass filter for blurring, and for the edge enhancement processing for sharpening, so as to obtain color-difference signals Cb2 and Cr2, respectively. As the human is less sensitive to the chromaticity than to the luminance, the signals are often subjected to the low-pass filter in order to reduce chromaticity noise, not to the edge enhancement. However, all chromaticity information is blurred, and hence the chromaticity may be reduced, resulting in the cases where the color of a signal lamp bleeds, and a yellow line is recognized as a while line because the white line and the yellow line on a road, which are important to drive support, are blurred.

In a step S107, the color space converting unit 43 performs chromaticity enhancement and suppression processing. More specifically, it enhances and suppresses a chromaticity value by the following formulae.

$$Cr3 = k \times Cr2$$

$$Cb3 = k \times Cb2 \qquad (4)$$

Here, the suppression is often made by making k one or less, in order to reduce the chromaticity noise. Although the chromaticity noise is suitably reduced when k is one or less, there is a problem in that the chromaticity information is lost.

In a step S108, the color space converting unit 43 performs chromaticity calculation processing. Different from Y3, the luminance signal Y1 (or Y2) is obtained by adding the visible light component and the infrared light component, and therefore, the chromaticity is adjusted by a ratio in order to maintain balance (ratio) with the luminance value. Thus, the balance of the luminance chromaticity is maintained, $$Cr4 = (Y2/Y3) \times Cr3$$

$$Cb4 = (Y2/Y3) \times Cb3 \qquad (5)$$

Further, the RGB color signal generating unit 44 performs inverse conversion of the formulae (3) to calculate color signals dR', dG', and dB' from the luminance signal Y2 and the color-difference signals Cr4 and Cb4. Thus-obtained color signals dR', dG', and dB' are outputted to an external monitor, so as to obtain a color image. Although the adjustment can be made, however, the problem exists as described above.

Example

Figure 8:
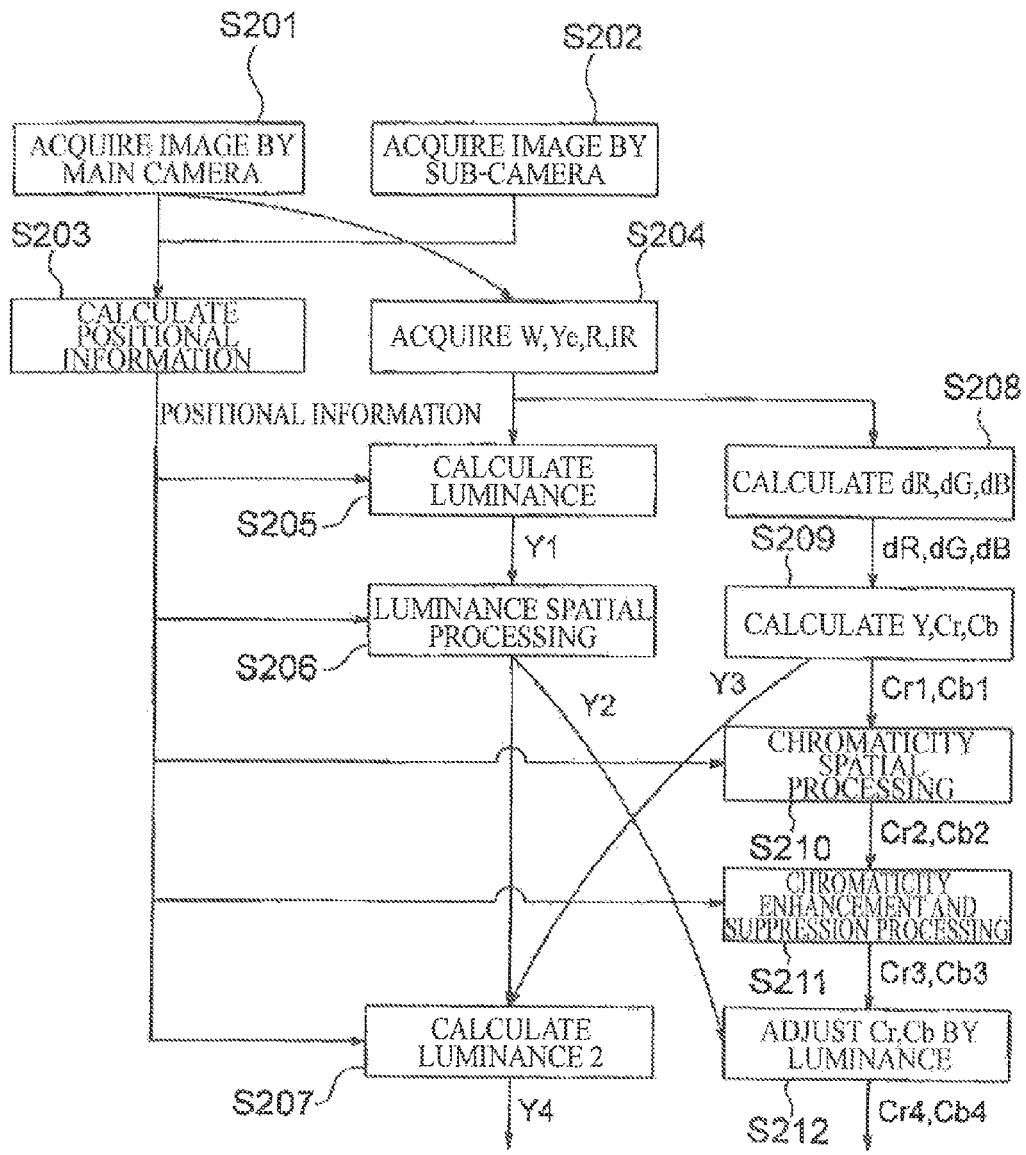
FIG. 8 is a flowchart showing operation of an example.

Mow, an example will foe explained. FIG. 8 is a flowchart of the example. First, in a step S201 in FIG. 8, the object is photographed by the main camera MC and at the same time, the same object is photographed by the sub-camera SC in a step S202. In a step S203, the positional information detecting unit 8 finds the positional information (the distance Z and the height H of the object) as described above.

In a step S204, the color interpolating unit 41 subjects the image component Ye, the image component R, the image component IR, and the image component W, which are outputted from the imaging element 3A, to the interpolation processing for interpolating the missing pixel data, respectively, and allows the image component R, the image component IR, the image component W, and the image component Ye to be the image data having the same pixel number as the pixel number of the imaging element 3A. Incidentally, the missing pixel data is caused in the image components Ye, R, IR, and W because the R pixel, the IR pixel, the W pixel, and the Ye pixel are arranged in the zigzag manner. For the interpolation processing, for example, the linear interpolation processing may be employed.

In a step S205, the color space converting unit 43 calculates the luminance signal Y1 that is obtained by adding; the image components Ye, R, IR, and W as the luminance signal of the color space to be converted, as shown by the formula (1'), and at this time, the luminance signal Y1 can be adjusted based on the positional information detected in the step S203.

$$Y1 = (a \times W + b \times Ye + c \times R + d \times IR)/(a+b+c+d) \qquad (1')$$

In the formula (1'), a, b, c, and d are weighting factors, each of which is typically one. Its minimum weight is zero and, when the weight is one or more, it means that the enhancement is made further. In this case, it is necessary to control the addition amount of the infrared light component, and therefore, a, b and c may be equal to each other with regard to the visible light components. Alternatively, a may be set as the weight nearest to the visible light, and a may be set as the weight nearest to the infrared light, according to infrared sensitivity included in spectral sensitivity of the sensors. When the value of the factor increases, the information of the sensor is reflected significantly.

Figure 9:
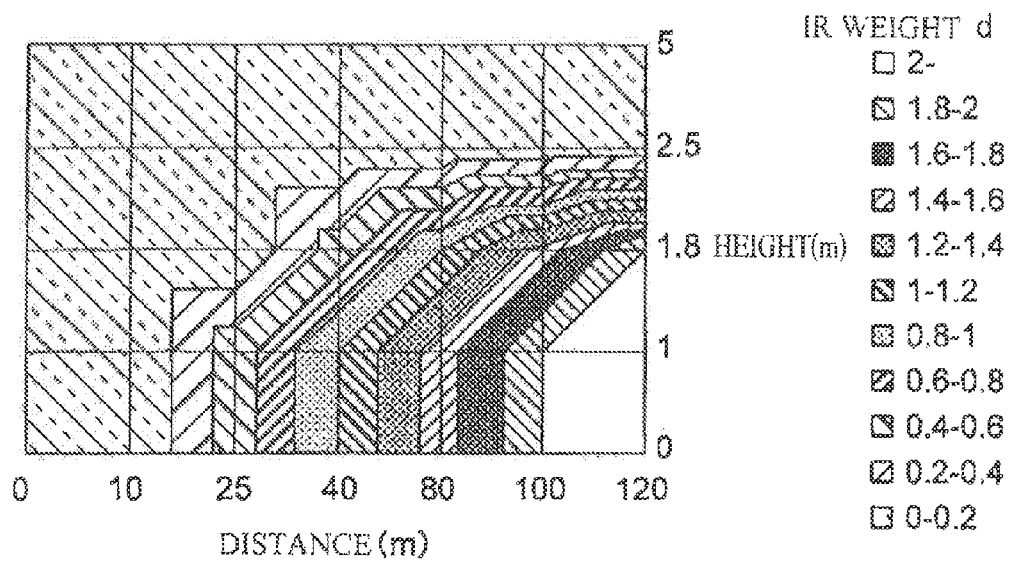
FIG. 9 is a view showing an example of weighting of an infrared light component.
Figure 10:
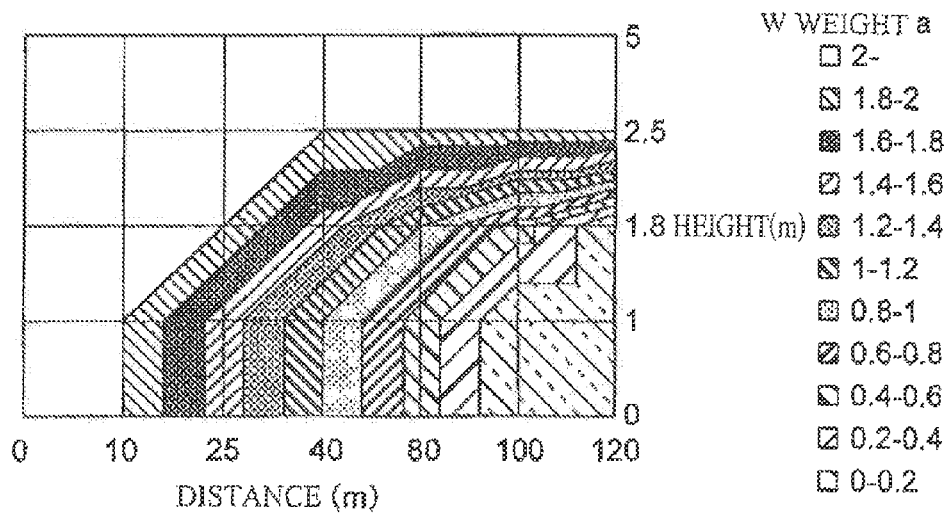
FIG. 10 is a view showing an example of weighting of a visible light component.

In luminance signal calculation processing, it is preferable to weight a (=b and c) and d as shown in graphs in FIG. 9 and FIG. 10, according to the distance and the height, so that processing as in a later-described Table 2 can be performed. Namely, as shown in FIG. 9, the weight of a is decreased as the distance to the object increases, and the weight of a is decreased (made closer to zero) as the height of the object increases. Meanwhile, as shown in FIG. 10, the weight of a is increased as the distance to the object increases, and the weight of a is increased (made closer to two) as the height of the object increases.

Figure 11:
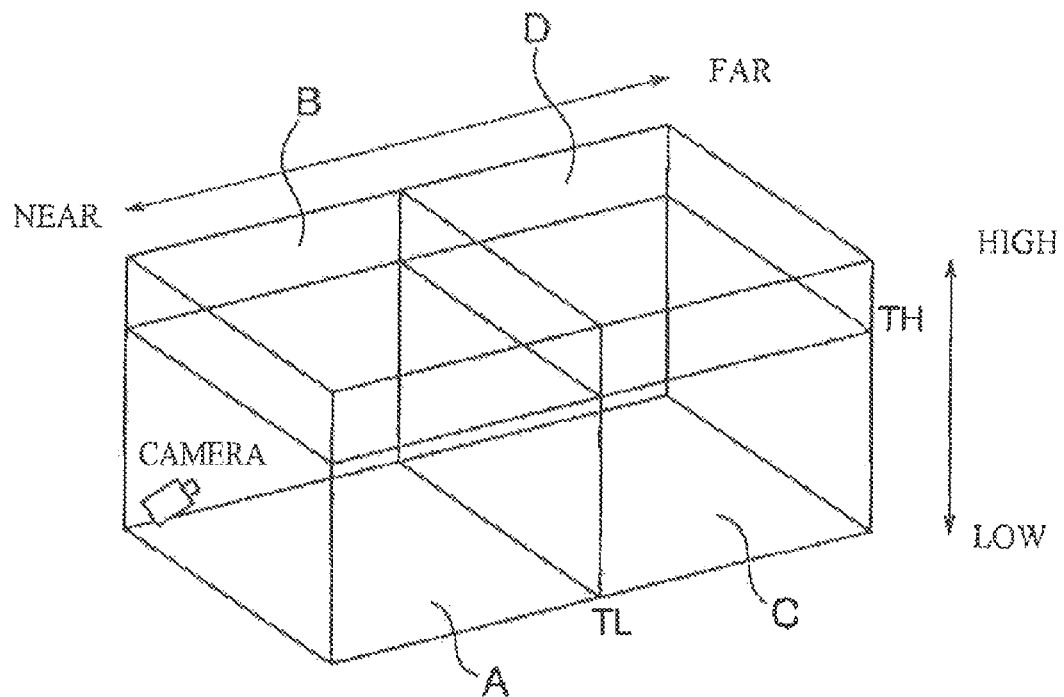
FIG. 11 is a view showing a state of four regions divided according to a distance to and a height of the object.

When such a function as d=func (distance, height) that has the distance and the height as parameters is used, for the weights a, b, c and d, and when the parameters are changed gradually, reproduction is changed smoothly and visibility is improved. The function may be a numerical formula or a look-up table. For convenience, as shown in FIG. 11, a region in which the object exists may be divided into four, that is, a region A where the distance to the object is smaller than a threshold value TL and the height of the object is lower than a threshold value TH, a region B where the distance to the object is smaller than the threshold value TL and the height of the object is equal to or higher than, the threshold value TH, a region C where the distance to the object is equal to or greater than the threshold value TL and the height of the object is lower than the threshold value TH, and a region D where the distance to the object is equal to or greater than the threshold value TL and the height of the object is equal to or higher than the threshold value TH, and the weight may be changed for each of the regions.

Figure 12:
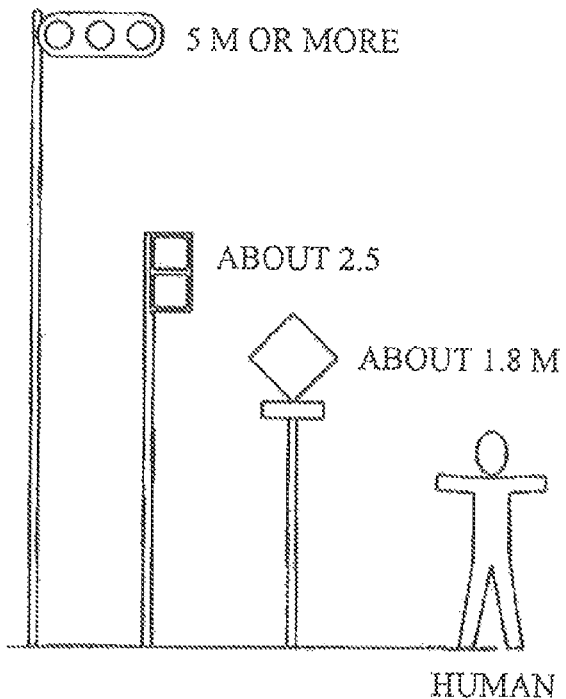

Effects of the above-described processing will be explained. As shown in FIG. 12, for example, the height of the signal lamp is from 2.5 m to 5 m or more, a signpost is around 1.8 m, and the height of the human is generally 1.8 m or less according to specifications. Namely, there are many light emitting objects, whose colors need to be identified in particular, at the height of 2 m or more. Meanwhile, it is necessary to clearly identify the object, rather than the color, at the height less than 2 m.

Figure 13:
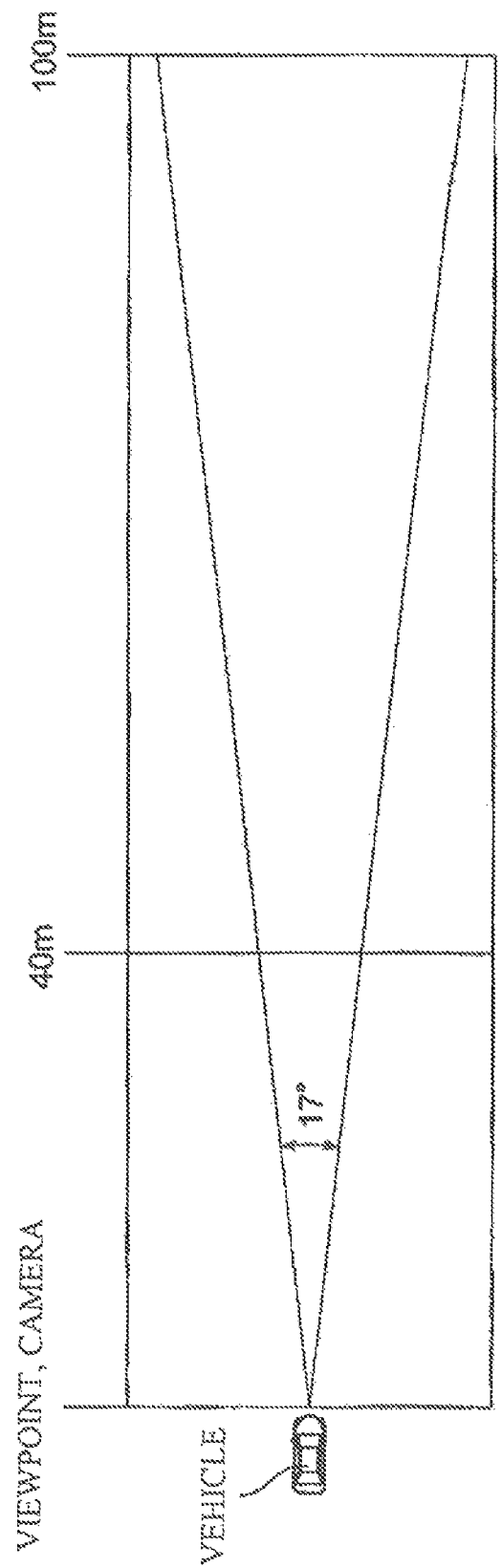
FIG. 13 is a view showing an irradiation area of headlights of a vehicle.

As shown in FIG. 13, the headlights of the vehicle as the light emitting unit 6 use a light source of the visible light for the low beam to light up up to about 40 m away, and use a light source of an infrared light only, not including the visible light, for the nigh beam to light up up to about 100 m away. Therefore, when the distance to the object is 40 m or less, there is enough visible light information, and when the distance to the object is greater than 40 m, the visible light information is not enough and it is necessary to depend on infrared light information. Consequently, it is desirable to use 40 m as a threshold value of the distance to the object, and change the processing, when a driver who drives the vehicle is selecting the low beam, and to use 100 m as the threshold value of the distance to the object, and change the weighting, when the driver is selecting the high beam. This makes it possible to prevent the object image from being brightened too much due to the infrared light component. The irradiation area detecting unit 7 can detect which of the low beam and the high beam is being selected.

In a step S206, the color space converting unit 43 performs the luminance spatial processing. More specifically, it allows the luminance signal Y1 to pass through the low-pass filter for blurring, and to the edge enhancement processing for sharpening. Thus-obtained luminance signal is regarded as Y2. At this time, the luminance signal Y2 can be adjusted based on the positional information detected in the step S203.

In the luminance signal calculation processing, the luminance signal Y1 is allowed to pass through the low-pass filter to reduce infrared light component noise when the height of the object is high, so that processing as in a later-described Table 4 can be performed. Meanwhile, it is subjected to the edge enhancement processing to sharpen the object and to improve the visibility when the height of the object is low. Thus, the adjustment of the luminance signal Y2 is made.

Figure 14:
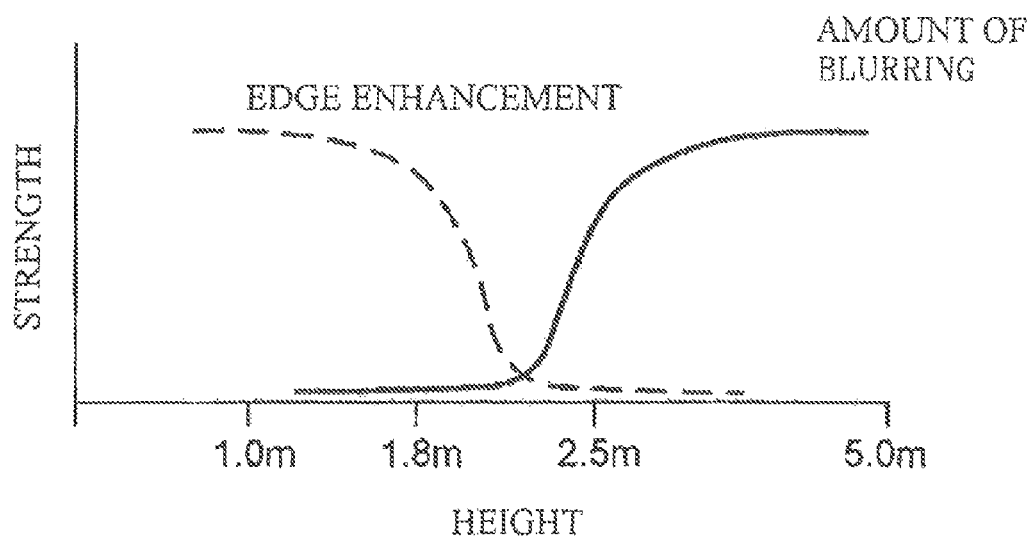
FIG. 14 is a view showing an example of a function changing edge enhancement and weighting of blurring according to the height of the object.

More specifically, resolution is required for the drive support according to the height, of the object, and the resolution is less required for the signal and the like, for example, because it is the color of the lamp that is required. Therefore, it is desirable that the luminance signal of the object that is higher than the threshold value is subjected to the low-pass filter in order to reduce the noise due to the included infrared light component, and the luminance signal of the object that is lower than the threshold value is subjected to the edge enhancement. The weight may be assigned according to a function shown in FIG. 14, and switching may be made at about 2 m, that is, the height of the signal. Similarly to the luminance calculation, the switching may be made according to the distance. For example, as the noise increases when the distant is subjected to the edge enhancement, the distant may not be subjected to the edge enhancement even though the height is low. As to a blurring method, that is, when the low-pass filter is used, processing to average pixel values in a window consisting of 3×3 pixels is repeated. Alternatively, the size of the window is increased to 5×5 pixels and 7×7 pixels. As to the edge enhancement processing, an edge is detected by an edge detection filter such as a Sobel filter, which is multiplied by a factor and added.

In a step S207, the color space converting unit 43 calculates a luminance signal Y4 by using the luminance signal Y3 obtained in a later-described step S209, according to the following formula. Although the luminance signal Y2 is used as it is according to the comparative example, the calculation is made by using the luminance signal Y2 that depends on the infrared light information, and the luminance signal Y3 that depends on the visible light information, as the infrared light component is subtracted in RGB calculation, as the weighting, so that the effect similar to the later-described luminance signal calculation processing in the Table 2 can be obtained. This processing may be performed by two processing blocks, or either one of these. As the infrared light component is completely subtracted from, the luminance signal Y3 information, the effect can be further improved when the weight of the luminance signal Y3 is increased, as compared with the luminance signal calculation processing in the Table 2. α is determined from the distance and the height of the object, similarly to the luminance signal calculation processing in the Table 2, $$Y4 = \alpha \times Y2 + (1-\alpha) \times Y3 \quad (6)$$

At the same time, in a step S208, the color signal generating unit 42 combines the image component Ye, the image component R, the image component IR, and the image component W that are subjected to the interpolation processing by the color interpolating unit 41, by using the following formulae (2), to generate the color signals dR, dG, and dB (RGB color signals), $$dR = R - IR$$

$$dG = Ye - R$$

$$dB = W - Ye \quad (2)$$

In the step S209, the color space converting unit 43 converts the color signals dR, dG, and dB into the color space including the luminance signal Y3 and the color-difference signals Cb1 and Cr1, as shown in formulae (3). Here, the color-difference signal Cb1 means the blue color-difference signal and the color-difference signal Cr1 means the red color-difference signal, $$Y3 = 0.3 \times dR + 0.6 \times dG + 0.1 \times dB$$

$$Cb1 = dR - Y3$$

$$Cr1 = dB - Y3 \quad (3)$$

In a step S210, the color space converting unit 43 performs the chromaticity spatial, processing. Here, the chromaticity signals Cb2 and Cr2 can be adjusted based on the positional information detected in the step S203. More specifically, the color-difference signals Cb1 and Cr1 are allowed to pass through the low-pass filter for blurring, and are subjected to the edge enhancement, processing for sharpening, so as to obtain the color-difference signals Cb2 and Cr2.

In the chromaticity spatial processing, the color-difference signals Cb1 and Cr1 are allowed to pass through the low-pass filter to reduce the infrared light component noise when the distance to the object is greater than the threshold value, so that processing as in a later-describe Table 5 can be performed. Meanwhile, these are subjected to the edge enhancement processing to sharpen the object, and to improve the visibility when the distance to the object is smaller than the threshold, value.

Figure 15:
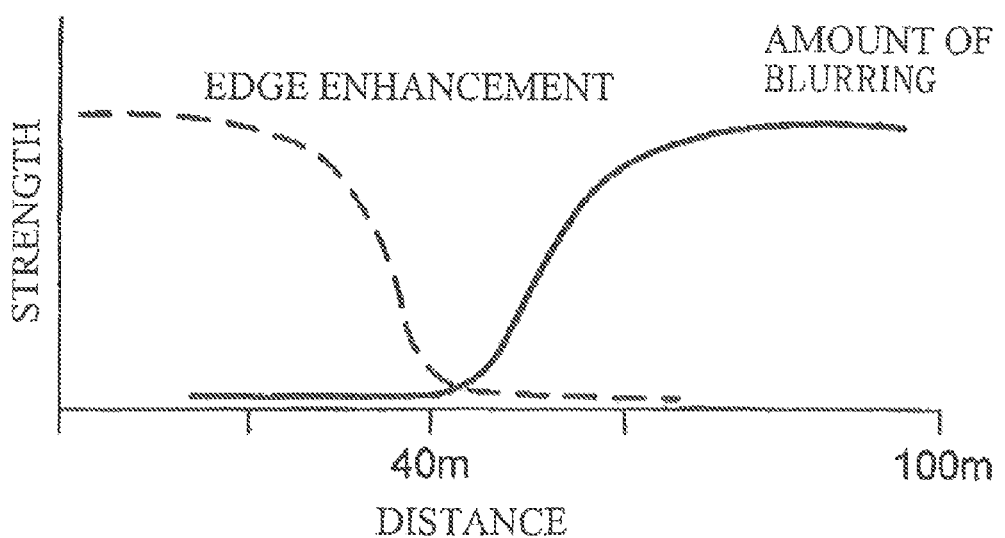
FIG. 15 is a view showing an example of a function changing edge enhancement and weighting of blurring according to the distance to the object.

Particularly, when the distance to the object is greater, the chromaticity noise is easily generated, because the visible light information hardly exists. Accordingly, it is preferable to blur the distant object. On the contrary, it is preferable to perform the edge enhancement of the near object in order to identify an obstacle more easily. When the low beam is being selected, for example, the weight may be assigned according to a function as shown in FIG. 15, and the switching may be made at about 40 m, that is, the limit of irradiation of the low beam. According to the above-described comparative example, all the regions are blurred in order to reduce the noise, resulting in the cases where the signal lamp bleeds and the color of the yellow line on the road becomes an achromatic color. According to this example, however, the enhancement can be made according to the distance to the object, and such disadvantages can be corrected.

In a step S211, the color space converting unit 43 performs the chromaticity enhancement and suppression processing. More specifically, it enhances and suppresses the chromaticity value according to the following formulae. At this time, chromaticity signals Cb3 and Cr3 can be adjusted based on the positional information detected in the step S203.

$$Cr3 = k \times Cr2$$

$$Cb3 = k \times Cb2 \quad (4)$$

Here, the signal and the like as the object, that is higher than the threshold value include the infrared light information, and flared highlights is caused easily. Therefore, the chromaticity is enhanced as in a later-described Table 3. Even when the signal is at a distant place, dependence on the distance is not preferable because the color of the lamp needs to be identified if possible. On the contrary, when the object that is lower than the threshold value is at a place away from a predetermined distance, it is preferable that the chromaticity is suppressed (k is made closer to zero; so as to reduce the chromaticity noise. Meanwhile, when the object is at a place closer than the predetermined distance, it is preferable that the chromaticity is not suppressed (k is made one or more) as there is enough visible information. The chromaticity may be enhanced in some cases. Thus, similarly to the luminance signal calculation processing, the factor k may be determined by the function of the height and the distance. Similarly to the graphs in FIG. 9 and FIG. 10, although not illustrated, the factor k may be determined, by using a numerical formula, a threshold value and a look-up table.

In a step S212, the color space converting unit 43 performs the chromaticity calculation processing. Different from Y3, the luminance signal Y1 (or Y2) is obtained by adding the visible light component and the infrared, light component, and therefore, the chromaticity is adjusted by the ratio in order to maintain balance (ratio) with the luminance value. Thus, the balance of the luminance chromaticity is maintained, $$Cr4 = (Y2/Y3) \times Cr3$$

$$Cb4 = (Y2/Y3) \times Cb3 \quad (5)$$

Further, the RGB color signal generating unit 44 performs the inverse conversion of the formulae (3) to calculate the color signals dR', dG', and dB' from the luminance signal Y2 and the color-difference signals Cr4 and Cb4. Thus-obtained color signals dR', dG', and dB' are outputted to the external monitor, so as to obtain the color image,

TABLE 2

Luminance processing

| | | Distance | |
|---|---|---|---|
| | | Near | Far |
| Height | High | Reducing saturation of signal | |
| | Low | Not using infrared | Adding visible and infrared for visualization |

TABLE 3

Color processing

| | | Distance | |
|---|---|---|---|
| | | Near | Far |
| Height | High | Enhancing signal color | |
| | Low | Not particularly adjusted | Reducing chromaticity and reducing noise |

TABLE 4

Luminance spatial processing

| | | Distance | |
|---|---|---|---|
| | | Near | Far |
| Height | High | Reducing noise due to infrared | |
| | Low | Sharpening to facilitate visualization | |

TABLE 5

Color spatial processing

| | | Distance | |
|---|---|---|---|
| | | Near | Far |
| Height | High | Sharpening to facilitate visualization | Blurring to reduce color noise |
| | Low | | |

Second Embodiment

Figure 16:
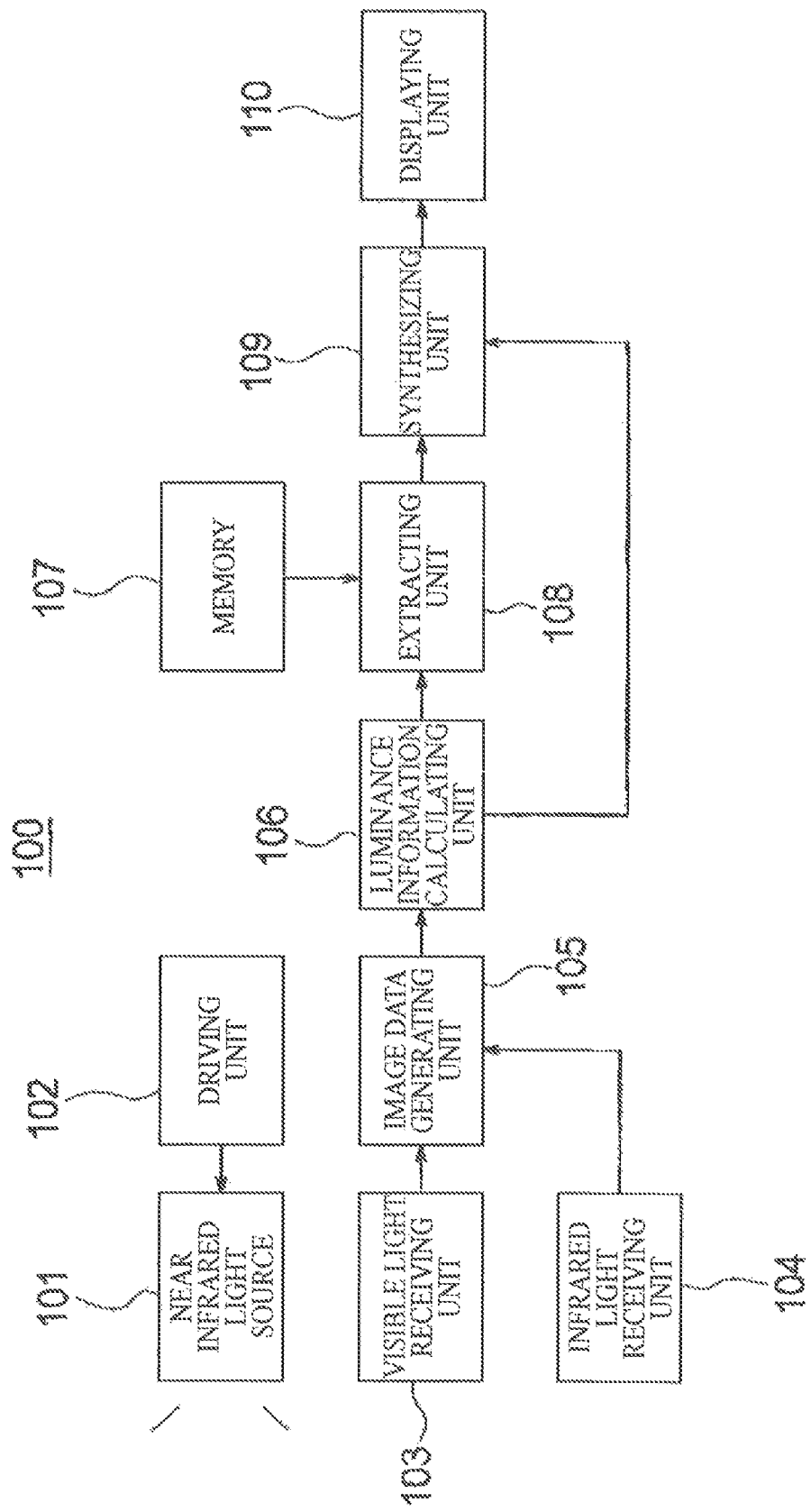
FIG. 16 is a block diagram of an image processing device 100 according to a second embodiment.

Hereinafter, an embodiment of the present invention will be explained in detail with reference to the drawings. FIG. 16 is a block diagram of an image processing device 100 according to a second embodiment. This image processing device 100 can be applied to a back view camera mounted on the vehicle, but the application is not limited thereto, and may be applied to a security camera, for example. The image processing device 100 has a near infrared light source 101 that projects near infrared light to the object, a driving unit 102 that drives the near infrared light source 101, a visible light receiving unit 103 that receives the visible light component from the object and converts it into the image signal, an infrared light receiving unit 104 that receives a near infrared light component from the object and converts it into the image signal, an image data generating unit 105 that performs the A/D conversion of the image signals inputted from the visible light receiving unit 103 and the infrared light receiving unit 104, and generates visible light image data and infrared light image data, a luminance information, calculating unit 106 that calculates luminance information of the object from the generated infrared light image data, a memory (storing means) 107 that stores the luminance information of infrared light images of a plurality of types of the objects whose luminance information is stored, an extracting unit (extracting means) 108 that extracts the infrared light image of the corresponding object based on the luminance information stored in the memory 107, a synthesizing unit (synthesizing means) 109 that performs image processing so as to paste the extracted infrared light image of the object on the visible light image, and a displaying unit (displaying means) 110 that displays the visible light image based on the visible light image data, the infrared light image based on the infrared light image data, the image based on the synthesized image data, and the like. Incidentally, the visible light receiving unit 103, the infrared light receiving unit 104, and the image data generating unit 105 form imaging means.

Figure 17:
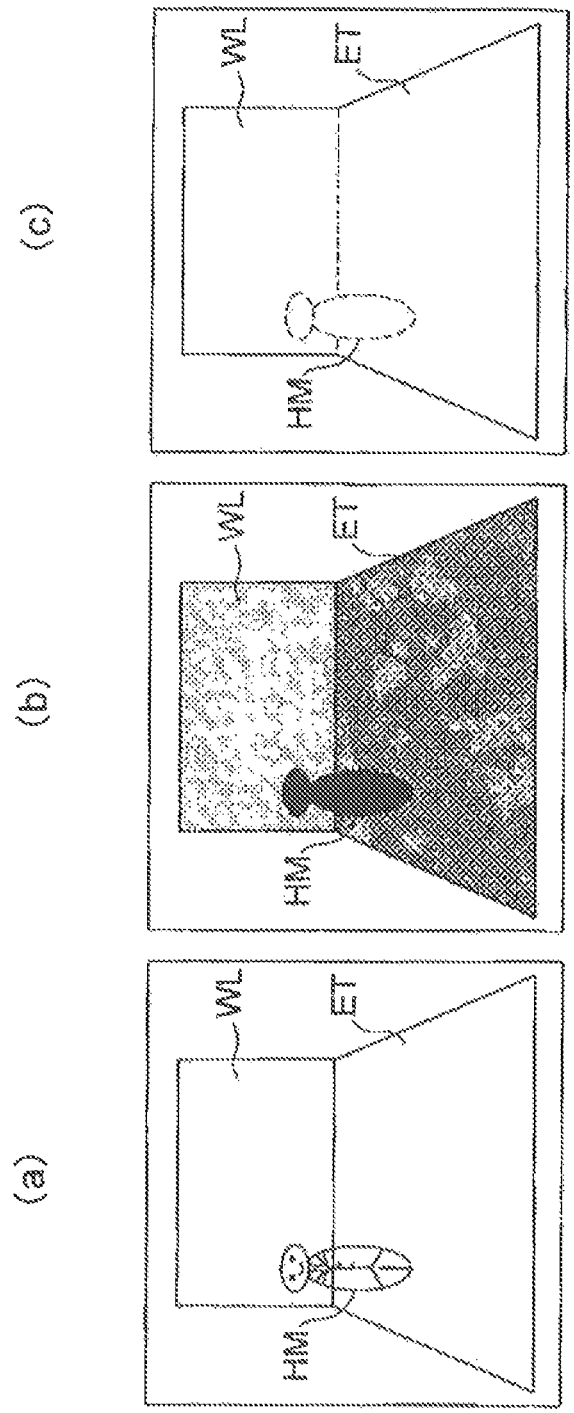

FIG. 17 are views showing states how images photographed by the image processing device 100 of this embodiment are displayed on the display unit 110. First, when average luminance in the visible light is found by the visible light image data obtained in the image data generating unit 105, it is equal to or greater than a predetermined value at daytime or the like. In this case, the visible light image obtained by the visible light image data is sufficiently clear by sunlight only, and a human HM, a wall WL, and a ground ET can be distinguished clearly, as shown in FIG. 17(a), and therefore, the synthesis of the images is not particularly required.

However, the average luminance in the visible light relatively decreases at nighttime or the like, and the visible light image has low gradation, and lower visibility, as shown in FIG. 17(b). For this reason, the human HM, the wall WL, and the ground ET cannot be distinguished clearly, and it is difficult to drive the vehicle in reverse guided by this visible light image. On the contrary, when the infrared light image obtained based on the infrared light image data obtained in the image data generating unit 105 is displayed, all of the human HM, the wall WL, and the ground ET are displayed brightly, as shown in FIG. 17(c), and it is also difficult to drive the vehicle in reverse guided by this infrared light image. Such problems are solved by this embodiment as follows.

Figure 18:
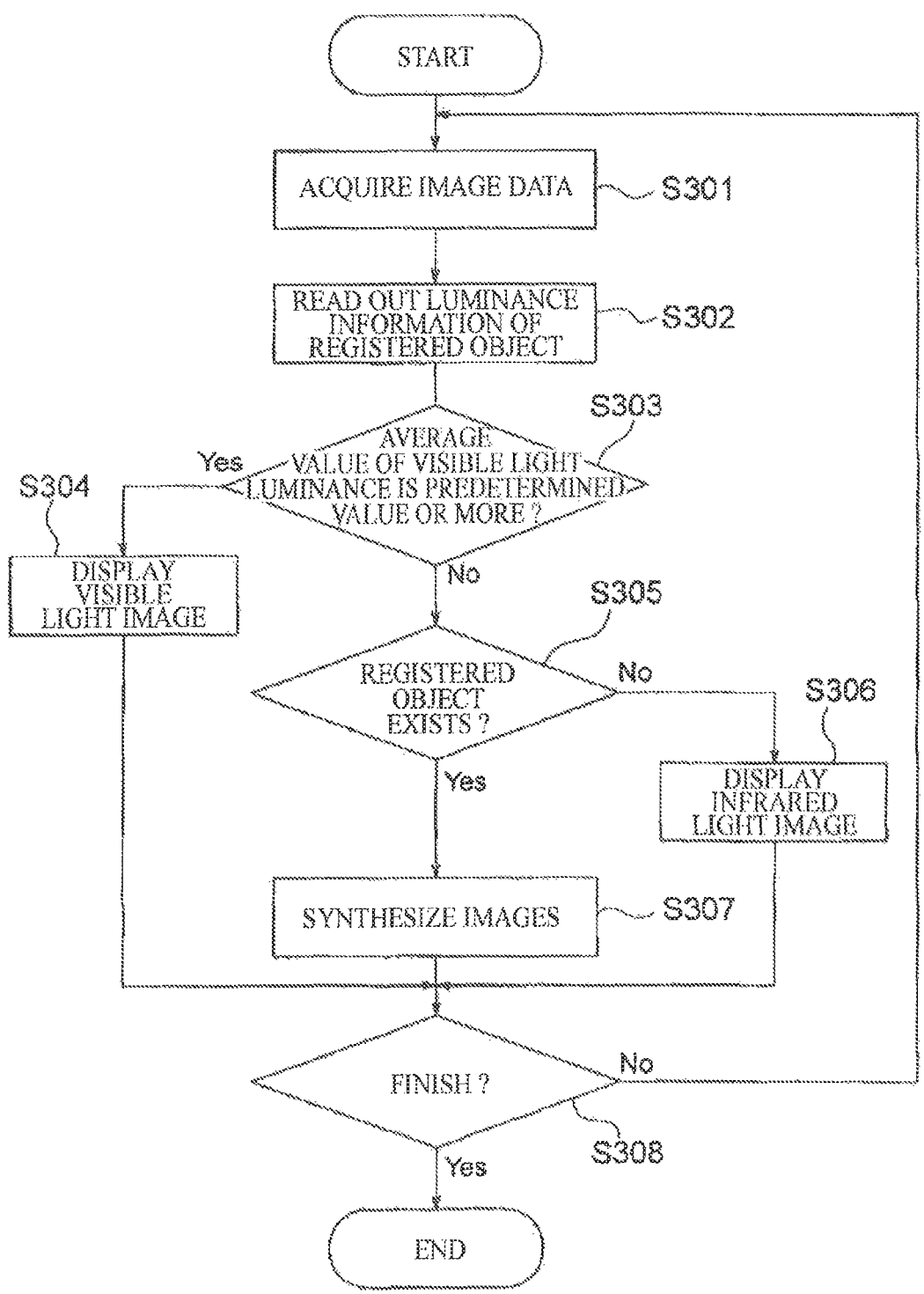
FIG. 18 is a flowchart showing operation of the image processing device 100 according to this embodiment.

FIG. 18 is a flowchart showing operation of the image processing device 100 according to this embodiment. FIG. 19 are views for explaining processing details performed by the image processing device 100 according to this embodiment.

As upstream operation, the image processing device 100 stores the luminance information of the object (the human, in this case) in the memory 107. As one example, various shapes of postures of a plurality of types of the objects, such as humans and animals, can be converted into data and stored in advance as the infrared light luminance information. Alternatively, when the displaying unit 110 has a touch panel or clickable monitor, the luminance information may be stored by touching or clicking the visible light image of the object that is actually displayed on the monitor. The luminance information of the object that is imported by such operation is the visible light luminance information, which has a certain correlation with the infrared light luminance information. The visible light luminance information, multiplied by an appropriate factor and stored as the luminance information of the approximated infrared light, can be used, for pattern matching and the like in the actual infrared light image data, so as to extract the infrared light image data of the object. Moreover, known means for sensing the moving object may be provided and, when it senses the moving object in the infrared light image data, the luminance information of the moving object may be extracted and pasted, on the visible light image.

First, in a step S301 in FIG. 18, the image data generating unit 105 performs the A/D conversion of the image signals inputted, from the visible light receiving unit 103 and the infrared light receiving unit 104, and generates the visible light image data and the infrared light image data. Next, in a step S302, the extracting unit 108 reads out the luminance information of the object that is stored in the memory 107 in advance.

Further, in a step S303, the luminance information calculating unit 106 calculates the average luminance based on the visible light image data, and determines whether it is equal to or greater than the predetermined value. When it is determined that the average luminance is equal to or greater than the predetermined value, the extracting unit 108 does not extract the infrared light image data. Therefore, the synthesizing unit 109 does not perform the image synthesis, and in a step S304, the display device 110 displays the visible light image based on the visible image data, (refer to FIG. 19(a)).

Meanwhile, when the luminance information calculating unit 106 determines that the average luminance is less than the predetermined value, the extracting unit 108 performs the pattern matching in the infrared light image data, using the luminance information of the object that is read out from the memory 107 so as to determine whether the object, whose luminance information is stored in advance, exists or not, in a step S305. When it is determined that the object, whose luminance information is stored in advance, does not exist, the extraction of the infrared light image data is not performed. Further, the image synthesizing unit 109 does not perform the image synthesis and, in a step S306, the display device 110 displays the infrared light image based on the infrared light image data (refer to FIG. 19(c)). In this case, it is possible for the driver to make sure that the human or the like does not exist by viewing the displayed image plane, so that the driver can drive the vehicle while paying attention as usual.

Meanwhile, when it is determined by the extracting unit 108 that the object, whose luminance information is stored in advance, exists, the infrared light image data corresponding to the object is extracted from the original infrared light image data and, in a step S307, synthesizing processing is performed by the image synthesizing unit 109 so as to replace the infrared light image data corresponding to the extracted object by the image data of the corresponding object in the visible light image data (refer to FIG. 19(b)). Thus, the image of the object such as the human, whose luminance information is stored in advance, is pasted on a dark background and displayed brightly and in an emphasized manner, so as to call attention to the driver. In this case, facial, expressions on the face of the object cannot be recognized, which does not cause problems because it is only necessary to call attention to the driver. When it is not determined as a finish in a step S308, it returns back to the step S301 and similar steps are repeated.

The above situations and image processing are summarized in a Table 6,

TABLE 6

| Situation | Human is detected in infrared light image | Human is detected in visible light image | Estimation of situation | Display method |
|---|---|---|---|---|
| 1 | Yes | Yes | Pedestrian can be recognized by visible light only | Visible light image |
| 2 | Yes | No | Human exists but cannot be recognized by visible light due to lowered luminance | Infrared light image in human region |
| 3 | No | No | Human does not exist | Visible light image |

Third Embodiment

Figure 20:
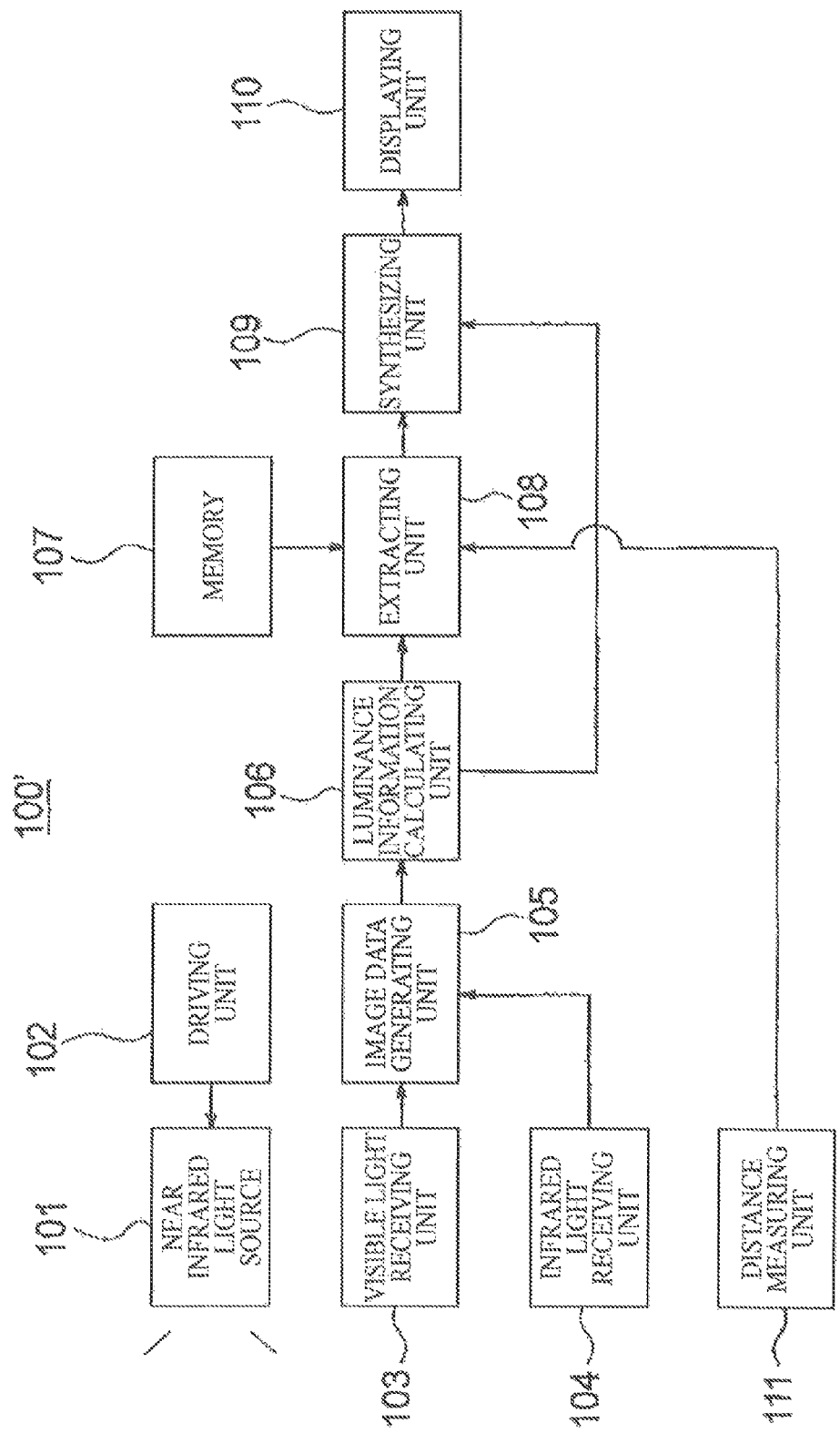
FIG. 20 is a block diagram of an image processing device 100' according to a third embodiment.

FIG. 20 is a block diagram of an image processing device 100' according to a third embodiment. This embodiment is different from the embodiment shown in FIG. 16 in that a distance measuring unit (distance measuring means) 111 to measure a distance to the object is provided. Various means can be used as the distance measuring unit 111, such as the one measuring the distance to the object by reflected light of infrared radiation projected by itself, the one measuring the distance to the object by a principle of a stereo camera using two imaging means, and the like. Specifically, the image input device 1 by the stereo camera, as shown in FIG. 1 and FIG. 4, can be used.

According to this embodiment, the distance measuring unit 111 finds the distance to the object and, when the object whose luminance information is stored in advance exists, the degree of enhancement of the infrared light image data, that replaces a part of the visible light image data, is changed (luminance value is relatively increased or decreased) according to the distance to the object.

Figure 21:
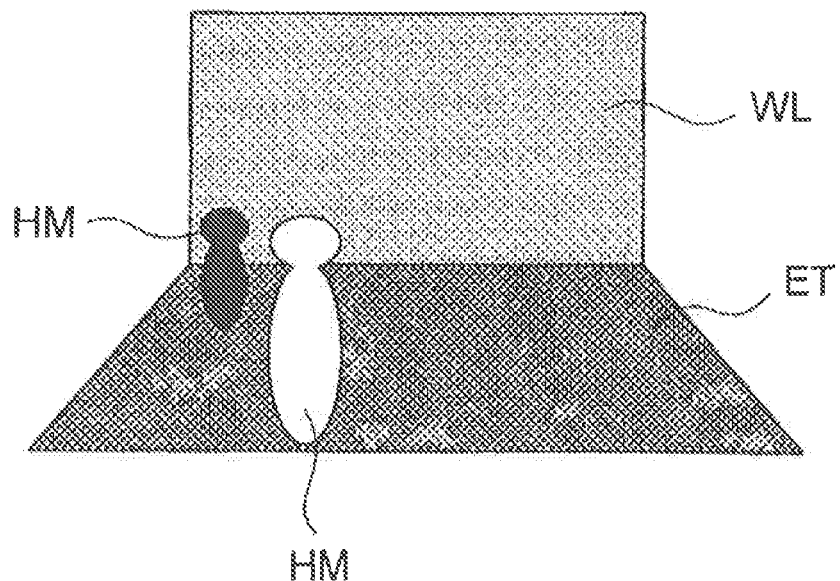
FIG. 21 is a view showing a state in which the image subjected to synthesizing processing by the image processing device 100' of this embodiment is displayed on the display device 110.

Thus, when there is a plurality of objects such as the humans, whose luminance information is stored in advance, as shown in FIG. 21, the nearest object can be displayed most brightly and in an emphasized manner. As to the degree of the increase in the luminance value, the luminance value may be increased linearly as the distance to the object decreases, but it may be increased at will according to the following formula. Thereby, the object image at a near place can be displayed brightly, and the object image at a distant place can be displayed darkly. Incidentally, the nearest object is the most important, and therefore, only the nearest object, may be replaced by the infrared light image.

$$Y = f(d) \times Ir \quad (1)$$

Figure 22:
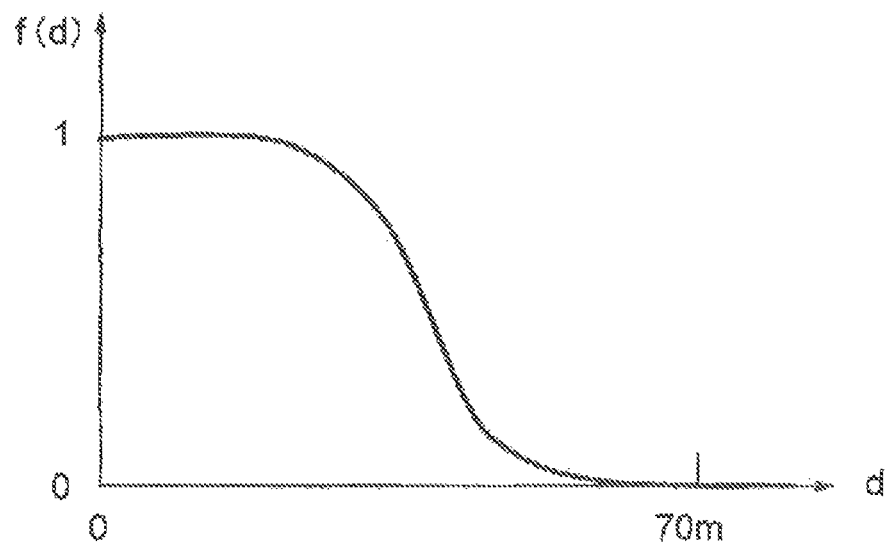
FIG. 22 is a view showing an example of a function f(d).

Y: a luminance value of a synthesized object
f(d): a function that changes according to an object distance d(m), an example of which is shown, in FIG. 22
Ir: a luminance value of an original object Incidentally, it is clear for the skilled in the art that the present invention is not limited to the embodiments described herein and includes other embodiments and modifications, from the embodiments and technical ideas described herein.

INDUSTRIAL APPLICABILITY

The image input device of the present invention can be applied to the onboard camera, the security camera, and the like, but the applications are not limited thereto. Moreover, according to the present invention, the imaging element for the visible light having the RGB filter and the imaging element to detect the infrared radiation may be combined to form one imaging means.

The image processing device of the present invention can be applied, to the onboard camera, the security camera, and the like, but the applications are not limited thereto.

REFERENCE SIGNS LIST

1 image input device
2 lens
3 imaging element
4 image processing unit
5 control unit
6 light emitting unit
7 irradiation area detecting unit
8 positional information detecting unit
41 color interpolating unit
42 color signal generating unit
43 color space converting unit
44 RGB signal generating unit
100, 100' image processing device
101 near infrared light source
102 driving unit
103 visible light receiving unit
104 infrared light receiving unit
105 image data generating unit
106 luminance information calculating unit
107 memory
108 extracting unit
109 synthesizing unit
110 displaying unit
111 distance measuring unit
ET ground
HM human
WL wall

The invention claimed is:

1. An image input device comprising:
a positional information acquiring unit for acquiring positional information including at least one of a height of an object and a distance to the object;
imaging means having at least three kinds of arranged pixels with different spectral sensitivities, to convert an incident object image into original image data having at least three kinds of original image components including a visible light component and an infrared light component; and
a color space converting unit which performs weighting to the visible light component and the infrared light component on the basis of the positional information acquired by the positional information acquiring unit, to convert the original image data into color space including a luminance signal and a chromaticity signal adjusted on the basis of the weighted visible light component and the infrared light component.

2. The image input device according to claim 1,
wherein the color space converting unit decreases the weight of the infrared light component in the luminance signal when it is determined that the height of the object is higher than a predetermined value according to the positional information.

3. The image input device according to claim 1,
wherein the color space converting unit decreases the weight of the infrared light component in the luminance signal when it is determined that the distance to the object is smaller than a predetermined value according to the positional information.

4. The image input device according to claim 1,
wherein the luminance signal is subjected to edge enhancement processing when it is determined that the height of the object is lower than a predetermined value according to the positional information.

5. The image input device according to claim 1,
wherein the luminance signal is passed through a low-pass filter when it is determined that the height of the object is higher than a predetermined value according to the positional information.

6. The image input device according to claim 1,
wherein the color space converting unit increases the weight of the visible light component in the chromaticity signal when it is determined that the height of the object is higher than a predetermined value according to the positional information.

7. The image input device according to claim 1,
wherein the color space converting unit decreases the weight of the visible light component in the chromaticity signal when it is determined that the distance to the object is smaller than a predetermined value according to the positional information.

8. The image input device according to claim 1,
wherein the chromaticity signal is subjected to edge enhancement processing when it is determined that the distance to the object is smaller than a predetermined value according to the positional information.

9. The image input device according to claim 1,
wherein the chromaticity signal is passed through a low-pass filter when it is determined that the distance to the object is greater than a predetermined value according to the positional information.

10. The image input device according to claim 1,
wherein the chromaticity signal is subjected to enhancement processing when it is determined that the height of the object is higher than a predetermined value according to the positional information.

11. The image input device according to claim 1,
wherein the chromaticity signal is subjected to suppression processing when it is determined that the height of the object is lower than a predetermined value according to the positional information.

12. The image input device according to claim 1,
wherein the chromaticity signal is subjected to suppression processing when it is determined that the distance to the object is greater than a predetermined value according to the positional information.

13. The image input device according to claim 1,
wherein the chromaticity signal is subjected to enhancement processing when it is determined that the distance to the object is smaller than a predetermined value according to the positional information.

14. The image input device according to claim 1, further comprising:
light emitting means for carrying out irradiating with visible light and infrared light; and
irradiation area calculating means for calculating an irradiation area where irradiation light from the light emitting means reaches,
wherein the color space converting unit performs weighting to the visible light component and the infrared light component on the basis of the irradiation area calculated by the irradiation area calculating means.

15. The image input device according to claim 1,
wherein the color space converting unit performs weighting and adding of the luminance signal depending on the visible light component and the luminance signal depending on the infrared light component to obtain a new luminance signal.

* * * * *